(12) United States Patent
Wang et al.

(10) Patent No.: US 12,353,185 B2
(45) Date of Patent: Jul. 8, 2025

(54) APPARATUS AND METHOD FOR EXTRACTING COMMON COMMAND INFORMATION FROM PLC LADDER INFORMATION

(71) Applicant: UDMTEK CO., LTD., Gyeonggi-do (KR)

(72) Inventors: Gi Nam Wang, Gyeonggi-do (KR); Jun Pyo Park, Gyeonggi-do (KR); Geun Ho Yu, Gyeonggi-do (KR); Seung Woo Han, Gyeonggi-do (KR); Gang Hee Han, Gyeonggi-do (KR); Min Young Jung, Gyeonggi-do (KR); Sang Chul Yoo, Gyeonggi-do (KR)

(73) Assignee: UDMTEK CO., LTD., Gyeonggi-do (KR)

( * ) Notice: Subject to any disclaimer, the term of this patent is extended or adjusted under 35 U.S.C. 154(b) by 524 days.

(21) Appl. No.: 17/722,580

(22) Filed: Apr. 18, 2022

(65) Prior Publication Data

US 2022/0342376 A1    Oct. 27, 2022

(30) Foreign Application Priority Data

Apr. 21, 2021   (KR) .......................... 10-2021-0051743

(51) Int. Cl.
*G05B 19/05*       (2006.01)
(52) U.S. Cl.
CPC ......... *G05B 19/056* (2013.01); *G05B 19/054* (2013.01); *G05B 2219/1126* (2013.01);
(Continued)
(58) Field of Classification Search
CPC ............... G05B 19/054; G05B 19/056; G05B 2219/1126; G05B 2219/1215; G05B 2219/13057
(Continued)

(56) References Cited

U.S. PATENT DOCUMENTS 7,143,366 B1 * 11/2006 McKelvey ................ G06F 8/71
                                                          715/965
2003/0023616 A1 * 1/2003 Kay ..................... G05B 19/056
(Continued)

FOREIGN PATENT DOCUMENTS

CN         110376959 A  * 10/2019
JP        2010-020635 A    1/2010
KR        10-0931004 B1   12/2009

OTHER PUBLICATIONS

Office Action from corresponding Korean Patent Application No. 10-2021-0051743, dated Aug. 4, 2022.

*Primary Examiner* — Jigneshkumar C Patel
(74) *Attorney, Agent, or Firm* — Harness, Dickey & Pierce, P.L.C.

(57) ABSTRACT

An apparatus for extracting common command information from programmable logic controller (PLC) ladder information according to the present invention may include: a logic information extracting portion configured to extract control logic information from XML information converted from PLC ladder information; and a common command converting portion configured to convert the control logic information extracted by the logic information extracting portion into common command information, wherein the logic information extracting portion is configured to extract, from the XML information, the control logic information in the form of a block obtained by grouping units that respectively represent contacts and lines constituting the PLC ladder information according to an AND condition and an OR condition.

8 Claims, 35 Drawing Sheets

(52) U.S. Cl.
 CPC ............... *G05B 2219/1215* (2013.01); *G05B 2219/13057* (2013.01)

(58) Field of Classification Search
 USPC .......................................................... 700/18
 See application file for complete search history.

(56) References Cited

U.S. PATENT DOCUMENTS

| 2018/0120823 | A1* | 5/2018 | Murata | G05B 19/048 |
| 2020/0125060 | A1* | 4/2020 | Fujimura | G05B 19/056 |

* cited by examiner

```
<Step>
    <Unit UnitType="A" Location="SHORIZONTAL" Address="P00001"></Unit>
    <Unit UnitType="A" Location="4" Address="P00004"></Unit>
    <Unit UnitType="VERTICAL" Location="A"></Unit>
    <Unit UnitType="A" Location="7" Address="P00002"></Unit>
    <Unit UnitType="VERTICAL" Location="9"></Unit>
    <Unit UnitType="LHORIZONTAL" Location="10" Size="81"></Unit>
    <Unit UnitType="OUT" Location="94" Address="P10000"></Unit>
    <Unit UnitType="A" Location="1031" Address="P00003"></Unit>
</Step>
```

FIG. 2b

| IMAGE | NAME | XML EXPRESSION |
|---|---|---|
|  | VERTICAL LINE | VERTICAL |
|  | HORIZONTAL LINE | SHORIZONTAL |
|  | AUTO-COMPLETE HORIZONTAL LINE | LHORIZONTAL |
|  | A CONTACT | A |
|  | B CONTACT | B |
|  | INPUT PULSE | IP |
|  | NPLUS | NP |
|  | OUTPUT CONTACT | OUT |
|  | CLOSED OUTPUT CONTACT | COUT |
|  | SET | S |
|  | RESET | RS |
|  | PULSE COIL | POUT |
|  | NPLUS COIL | NPOUT |
|  | FUNCTION | FUNC |
|  | NOT | NOT |

```
<Step>
    <Unit UnitType="A" Location="17409" Address="P00001"></Unit>
    <Unit UnitType="A" Location="17412" Address="P00002"></Unit>
    <Unit UnitType="SHORIZONTAL" Location="17415"></Unit>
    <Unit UnitType="VERTICAL" Location="17417"></Unit>
    <Unit UnitType="A" Location="17418" Address="P00003"></Unit>
    <Unit UnitType="VERTICAL" Location="17420"></Unit>
    <Unit UnitType="SHORIZONTAL" Location="17421"></Unit>
    <Unit UnitType="SHORIZONTAL" Location="17424"></Unit>
    <Unit UnitType="FUNC" Location="17427" Name="$<" Params="A01,A02"></Unit>
    <Unit UnitType="SHORIZONTAL" Location="17436"></Unit>
    <Unit UnitType="VERTICAL" Location="17438"></Unit>
    <Unit UnitType="A" Location="17439" Address="P00005"></Unit>
    <Unit UnitType="A" Location="17442" Address="P00006"></Unit>
    <Unit UnitType="VERTICAL" Location="17444"></Unit>
    <Unit UnitType="LHORIZONTAL" Location="17445" Size="54"></Unit>
    <Unit UnitType="OUT" Location="17502" Address="P10000"></Unit>
    <Unit UnitType="A" Location="18442" Address="P00004"></Unit>
    <Unit UnitType="VERTICAL" Location="18462"></Unit>
    <Unit UnitType="A" Location="18463" Address="P00007"></Unit>
    <Unit UnitType="A" Location="18466" Address="P00008"></Unit>
    <Unit UnitType="VERTICAL" Location="18468"></Unit>
    <Unit UnitType="SHORIZONTAL" Location="19487"></Unit>
    <Unit UnitType="A" Location="19490" Address="P00009"></Unit>
</Step>
```

FIG. 6b

| Address | Position | IsFunc | Member | Size / Param | Type |
|---|---|---|---|---|---|
| P00001 | 17409 | False | | 0 | A |
| P00002 | 17412 | False | | 0 | A |
| | 17415 | False | | 0 | SHORIZONTAL |
| | 17417 | False | | 0 | VERTICAL |
| P00003 | 17418 | False | | 0 | A |
| | 17420 | False | | 0 | VERTICAL |
| | 17421 | False | | 0 | SHORIZONTAL |
| | 17424 | false | | 0 | SHORIZONTAL |
| | 17427 | True | A01,A02 | 0 | $< |
| | 17436 | False | | 0 | SHORIZONTAL |
| | 17438 | False | | 0 | VERTICAL |
| P00005 | 17439 | False | | 0 | A |
| P00006 | 17442 | False | | 0 | A |
| | 17444 | False | | 0 | VERTICAL |
| | 17445 | False | | 54 | LHORIZONTAL |
| P10000 | 17502 | False | | 0 | OUT |
| P00004 | 18442 | False | | 0 | A |
| | 18462 | False | | 0 | VERTICAL |
| P00007 | 18463 | False | | 0 | A |
| P00008 | 18466 | False | | 0 | A |
| | 18468 | False | | 0 | VERTICAL |
| | 19487 | False | | 0 | SHORIZONTAL |
| P00009 | 19490 | False | | 0 | A |

FIG. 6c

| Key | Address | Child | Position | isFunc | Member | Parent | Type | tMember |
|---|---|---|---|---|---|---|---|---|
| ANB 0 | P00001 | | 17409 | False | | | A | |
| ANB 1 | P00002 | | 17412 | False | | | A | |
| ANB 2 | P00003 | | 17418 | False | | | A | |
| ANB 3 | | | 17427 | True | | | $< | A01,A02 |
| ANB 4 | P00005 | | 17439 | False | | | A | |
| ANB 5 | P00006 | | 17442 | False | | | A | |
| ANB 6 | P10000 | | 17502 | False | | | OUT | |
| ANB 7 | P00004 | | 18442 | False | | | A | |
| ANB 8 | P00007 | | 18463 | False | | | A | |
| ANB 9 | P00008 | | 18466 | False | | | A | |
| ANB 10 | P00009 | | 19490 | False | | | A | |
| Root | | | 2147483647 | False | | | | |
| Leaf | | | 2147483647 | False | | | | |

FIG. 7

| Key | Address | Child | Position | isFunc | Member | Parent | Type | tMember |
|---|---|---|---|---|---|---|---|---|
| ANB 0 | P00001 | ANB 1 | 17409 | False | | Root | A | |
| ANB 1 | P00002 | ANB 2, ANB 7 | 17412 | False | | ANB 0 | A | |
| ANB 2 | P00003 | ANB 3 | 17418 | False | | ANB 1 | A | |
| ANB 3 | | ANB 4, ANB 8, ANB 10 | 17427 | True | | ANB 2, ANB 7 | $< | A01,A02 |
| ANB 4 | P00005 | ANB 5 | 17439 | False | | ANB 3 | A | |
| ANB 5 | P00006 | ANB 6 | 17442 | False | | ANB 4 | A | |
| ANB 6 | P10000 | Leaf | 17502 | False | | ANB 5, ANB 9, ANB 10 | OUT | |
| ANB 7 | P00004 | ANB 3 | 18442 | False | | ANB 1 | A | |
| ANB 8 | P00007 | ANB 9 | 18463 | False | | ANB 3 | A | |
| ANB 9 | P00008 | ANB 6 | 18466 | False | | ANB 8 | A | |
| ANB 10 | P00009 | ANB 6 | 19490 | False | | ANB 3 | A | |
| Root | | ANB 0 | 2147483647 | False | | X | | |
| Leaf | | X | 2147483647 | False | | ANB 5, ANB 9, ANB 10 | | |

FIG. 12

| Key | Address | Child | Position | isFunc | Member | Parent | Type | tMember |
|---|---|---|---|---|---|---|---|---|
| ANB 11 | P00001 | ANB 2, ANB 7 | 17409 | False | ANB 0, ANB 1 | Root | A | |
| ANB 2 | P00003 | ANB 3 | 17418 | False | | ANB 11 | A | |
| ANB 3 | | ANB 4, ANB 8, ANB 10 | 17427 | True | | ANB 2, ANB 7 | $< | A01,A02 |
| ANB 4 | P00005 | ANB 5 | 17439 | False | | ANB 11 | A | |
| ANB 5 | P00006 | ANB 6 | 17442 | False | | ANB 4 | A | |
| ANB 6 | P10000 | Leaf | 17502 | False | | ANB 5, ANB 9, ANB 10 | OUT | |
| ANB 7 | P00004 | ANB 3 | 18442 | False | | ANB 1 | A | |
| ANB 8 | P00007 | ANB 9 | 18463 | False | | ANB 3 | A | |
| ANB 9 | P00008 | ANB 6 | 18466 | False | | ANB 8 | A | |
| ANB 10 | P00009 | ANB 6 | 19490 | False | | ANB 3 | A | |
| Root | | ANB 11 | 2147483647 | False | | X | | |
| Leaf | | X | 2147483647 | False | | ANB 5, ANB 9, ANB 10 | | |

FIG. 13b

| Key | Address | Child | Position | isFunc | Member | Parent | Type | tMember |
|---|---|---|---|---|---|---|---|---|
| ANB 11 | P00001 | ORB 12 | 17409 | False | ANB 0, ANB 1 | Root | A | |
| ORB 12 | P00003 | ANB 3 | 17418 | False | ANB 2, ANB 7 | ANB 11 | A | |
| ANB 3 | | ANB 4, ANB 8, ANB 10 | 17427 | True | | ORB 12 | $< | A01,A02 |
| ANB 4 | P00005 | ANB 5 | 17439 | False | | ANB 11 | A | |
| ANB 5 | P00006 | ANB 6 | 17442 | False | | ANB 4 | A | |
| ANB 6 | P10000 | Leaf | 17502 | False | | ANB 5, ANB 9, ANB 10 | OUT | |
| ANB 8 | P00007 | ANB 9 | 18463 | False | | ANB 3 | A | |
| ANB 9 | P00008 | ANB 6 | 18466 | False | | ANB 8 | A | |
| ANB 10 | P00009 | ANB 6 | 19490 | False | | ANB 3 | A | |
| Root | | ANB 11 | 2147483647 | False | | X | | |
| Leaf | | X | 2147483647 | False | | ANB 5, ANB 9, ANB 10 | | |

FIG. 14b

| Key | Address | Child | Position | isFunc | Member | Parent | Type | tMember |
|---|---|---|---|---|---|---|---|---|
| ANB 13 | P00001 | ANB 4, ANB 8, ANB 10 | 17409 | False | ANB 11, ORB 12, ANB 3 | Root | A | |
| ANB 4 | P00005 | ANB 5 | 17439 | False | | ANB 13 | A | |
| ANB 5 | P00006 | ANB 6 | 17442 | False | | ANB 4 | A | |
| ANB 6 | P10000 | Leaf | 17502 | False | | ANB 5, ANB 9, ANB 10 | OUT | |
| ANB 8 | P00007 | ANB 9 | 18463 | False | | ANB 13 | A | |
| ANB 9 | P00008 | ANB 6 | 18466 | False | | ANB 8 | A | |
| ANB 10 | P00009 | ANB 6 | 19490 | False | | ANB 13 | A | |
| Root | | ANB 13 | 2147483647 | False | | X | | |
| Leaf | | X | 2147483647 | False | | ANB 5, ANB 9, ANB 10 | | |

FIG. 15b

| Key | Address | Child | Position | isFunc | Member | Parent | Type | tMember |
|---|---|---|---|---|---|---|---|---|
| ANB 13 | P00001 | ANB 14 | 17409 | False | ANB 11, ORB 12, ANB 3 | Root | A | |
| ANB 14 | P00005 | ANB 6 | 17439 | False | ANB 4, ANB 5 | ANB 13 | A | |
| ANB 6 | P10000 | Leaf | 17502 | False | | ANB 14, ANB 9, ANB 10 | OUT | |
| ANB 8 | P00007 | ANB 9 | 18463 | False | | ANB 13 | A | |
| ANB 9 | P00008 | ANB 6 | 18466 | False | | ANB 8 | A | |
| ANB 10 | P00009 | ANB 6 | 19490 | False | | ANB 13 | A | |
| Root | | ANB 13 | 2147483647 | False | | X | | |
| Leaf | | X | 2147483647 | False | | ANB 5, ANB 9, ANB 10 | | |

FIG. 16b

| Key | Address | Child | Position | isFunc | Member | Parent | Type | tMember |
|---|---|---|---|---|---|---|---|---|
| ANB 13 | P00001 | ANB 15 | 17409 | False | ANB 11, ORB 12, ANB 3 | Root | A | |
| ANB 14 | P00005 | ANB 6 | 17439 | False | ANB 4, ANB 5 | ANB 13 | A | |
| ANB 6 | P10000 | Leaf | 17502 | False | | ANB 14, ANB 15, ANB 10 | OUT | |
| ANB 15 | P00007 | ANB 6 | 18463 | False | ANB 8, ANB 9 | ANB 13 | A | |
| ANB 10 | P00009 | ANB 6 | 19490 | False | | ANB 13 | A | |
| Root | | ANB 13 | 2147483647 | False | | X | | |
| Leaf | | X | 2147483647 | False | | ANB 5, ANB 9, ANB 10 | | |

FIG. 17b

| Key | Address | Child | Position | isFunc | Member | Parent | Type | tMember |
|---|---|---|---|---|---|---|---|---|
| ANB 13 | P00001 | ORB 16 | 17409 | False | ANB 11, ORB 12, ANB 3 | Root | A | |
| ORB 16 | P00005 | ANB 6 | 17439 | False | ANB 14, ANB 15, ANB 10 | ANB 13 | A | |
| ANB 6 | P10000 | Leaf | 17502 | False | | ORB 16 | OUT | |
| Root | | ANB 13 | 2147483647 | False | | X | | |
| Leaf | | X | 2147483647 | False | | ANB 5, ANB 9, ANB 10 | | |

FIG. 18b

| Key | Address | Child | Position | isFunc | Member | Parent | Type | tMember |
|---|---|---|---|---|---|---|---|---|
| ANB 17 | P00001 | Leaf | 17409 | False | ANB 13, ORB 16, ANB 6 | Root | A | |
| Root | | ANB 13 | 2147483647 | False | | X | | |
| Leaf | | X | 2147483647 | False | | ANB 5, ANB 9, ANB 10 | | |

FIG. 19b

APPARATUS AND METHOD FOR EXTRACTING COMMON COMMAND INFORMATION FROM PLC LADDER INFORMATION

CROSS-REFERENCE TO RELATED APPLICATION

This application claims priority from Korean Patent Application No. 10-2021-0051743 filed on Apr. 21, 2021 in the Korean Intellectual Property Office, and all the benefits accruing therefrom under 35 U.S.C. 119, the contents of which in its entirety are herein incorporated by reference.

TECHNICAL FIELD

The present invention relates to a common type conversion of a programmable logic controller (PLC) control program, and more particularly, to a technology for converting PLC ladder information converted into XML information into usable common command information.

BACKGROUND

A programmable logic controller (PLC) is a controlling device which secures stability for controlling a process of an automation industry and has been developed from a need of a controller which is programmable to correspond to frequent changes in an on-site system caused by small quantity batch production, has a small size, and is comparatively free in changing the system.

Programming languages for operating the PLC includes a ladder diagram (LD), a function block diagram (FBD), a structured text (ST), an instruction list (IL), a sequential function chart (SFC), a continuous function chart (CFC), and the like and are defined in International Electrotechnical Commission (IEC) 61131-3.

A structure of a PLC control program may be largely divided into tag information which includes information on contacts of a PLC and logic information which includes information on a PLC control program which is being driven. The logic information is a most basic element in operating an automation process and includes all pieces of information on a sequence, conditions, and the like for controlling facilities/process/line so as to be used as core information for managing and analyzing a process in a recent situation in which interest in a method of optimizing process management has been increased.

A control logic of a PLC control program is programmed using an LD among a variety of PLC programming languages in most industrial settings due to immediacy and simplicity of language. The LD arranges contacts for output for each step in an AND and OR structure and allows a sequence, conditions, and the like for controlling a process to be drafted using a variety of arithmetic operations, functions, and the like.

A PLC control program drafted using the LD is converted into a text-based PLC control program for processing and analysis. Text-based PLC control programs have different forms according to PLC manufactures. MITSUBISHI ELECTRIC and LSIS Co., Ltd, which are PLC manufactures, express a control logic of a PLC control program in text by using an IL. SIEMENS expresses a control logic of a PLC control program in text by using a standard template library (STL). Rockwell Automation expresses a control logic of a PLC control program in text according to its platform.

Users may intuitionally or easily understand a control logic of a PLC control program drafted in an LD by using PLC programming software provided by each PLC manufacturer.

Since a control logic of a text-based PLC control program which is extracted for analyzing process management has a different structure for each PLC manufacturer instead of the LD, users should understand an expression method of the control logic of the PLC control program for each PLC manufacturer in order to analyze the control logic of the PLC control program for each PLC manufacturer.

In particular, recently, tag information and ladder image information of PLC ladder programs are stored through XML. However, a technology that converts an XML structure into a control logic and a common command has not been developed and thus there is a limitation in effectively utilizing PLC ladder information converted into XML information.

PRIOR ART DOCUMENT

Patent Document (Patent Document 0001) Korean Patent Registration No. 10-0931004 (registered on Dec. 2, 2009)

SUMMARY

Aspects of the present invention provide an apparatus and method for extracting common command information from programmable logic controller (PLC) ladder information for converting PCL ladder information, which is converted into XML information, into common command information.

According to an aspect of the present invention, there is provided an apparatus for extracting common command information from PLC ladder information including: a logic information extracting portion configured to extract control logic information from XML information converted from PLC ladder information; and a common command converting portion configured to convert the control logic information extracted by the logic information extracting portion into common command information, wherein the logic information extracting portion is configured to extract, from the XML information, the control logic information in the form of a block obtained by grouping units that respectively represent contacts and lines constituting the PLC ladder information according to an AND condition and an OR condition.

The XML information may be obtained by converting a type for each of units into XML language, the units including a vertical line, a horizontal line, an auto-complete horizontal line, A contact, B contact, an input pulse, NPLUS, an output contact, a closed output contact, SET, RESET, a pulse coil, an NPLUS coil, a function, and NOT.

The logic information extracting portion may include a table information generation module configured to generate basic unit table information on units including a contact constituting the PLC ladder information, update the basic unit table information through setting of each of child units corresponding to a lower tree structure of each unit included in the basic unit table information by using the XML information, and update the basic unit table information through setting of parent units corresponding to the child units, and a block generation module configured to generate, according to a relation between the child units and the parent units, a block in which each unit is grouped according to the AND condition and the OR condition in the unit table information, and extract the control logic information by repeating the generation of a block until one final block is generated.

The table information generation module may generate the basic unit table information including an address value, a coordinate value, function status, inclusion or exclusion of a function member, a parameter value, and a unit type for each basic unit from the XML table information.

The table information generation module may select a target unit and a search coordinate for setting the child units, and compute a calculation coordinate by adding values of +3, +2, and −1022 to the search coordinate.

When a current search coordinate is positioned at a lower location in an image of the XML information compared to a previous search coordinate, the table information generation module may compute the calculation coordinate by adding only a value of +3 or +2 to the current search coordinate, and when the current search coordinate is positioned at an upper location in the image of the XML information compared to the previous search coordinate, the table information generation module may compute the calculation coordinate by adding only a value of +3 or −1022 to the current search coordinate.

When a unit, other than a horizontal line, an auto-complete horizontal line, and a vertical line, exists on the calculation coordinate obtained by adding +3 to the current search coordinate, the table information generation module may set the unit to be a child unit.

When a horizontal line appears on the calculation coordinate obtained by adding +3 to the current search coordinate, the table information generation module may set a value obtained by adding 3 to the current search coordinate to be a new search coordinate, and when an auto-complete horizontal line appears on the calculation coordinate obtained by adding +3 to the current search coordinate, the table information generation module may set a value obtained by adding 3+length value of the auto-complete horizontal line to the current search coordinate to be a new search coordinate.

When a vertical line appears on the calculation coordinate obtained by adding +2 to the current search coordinate, the table information generation module may set a value obtained by adding +1024 to the current search coordinate to be a new search coordinate, and when the vertical line appears on the calculation coordinate obtained by adding −1022 to the current search coordinate, the table information generation module may set a value obtained by adding −1024 to the current search coordinate to be a new search coordinate.

When a target unit for generating a block has one child unit and a parent unit of the child unit is only the target unit, the block generation module may set the block by grouping the target unit and the child unit as members that satisfy an AND condition.

When the number of units having the same parent unit as a parent unit of a target unit for generating a block among parent units corresponding to child units of the target unit is the same as the number of units that have the same ancestor unit as the parent unit of the target unit among parent units corresponding to the child units of the target unit, the block generation module may set the block by grouping the target unit and the child unit as members that satisfy the OR condition.

According to another aspect of the present invention, there is provided a method of extracting common command information from PLC ladder information including: extracting control logic information from XML information converted from PLC ladder information; and converting the extracted control logic information into common command information, wherein the extracting of the control logic information includes extracting, from the XML information, the control logic information in the form of a block obtained by grouping units that respectively represent contacts and lines constituting the PLC ladder information according to an AND condition and an OR condition.

The extracting of the control logic information may include generating basic unit table information on units including a contact constituting the PLC ladder information; updating the basic unit table information through setting of each of child units corresponding to a lower tree structure of each unit included in the basic unit table information by using the XML information; updating the basic unit table information through setting of parent units corresponding to the child units by using the XML information; and, according to a relationship between the child units and the parent units, generating a block in which each unit is grouped according to an AND condition and an OR condition in the unit table information, and extracting the control logic information by repeating the generation of a block until one final block is generated.

The updating of the basic unit table information through the setting of the child units may include selecting a target unit and a search coordinate for setting the child units, and computing a calculation coordinate by adding values of +3, +2, and −1022 to the search coordinate.

The updating of the basic unit table information through the setting of the child units may include, when the current search coordinate is positioned at a lower location in an image of the XML information compared to the previous search coordinate, computing the calculation coordinate by adding only a value of +3 or +2 to the current search coordinate, and when the current search coordinate is positioned at an upper location in the image of the XML information compared to the previous search coordinate, computing the calculation coordinate by adding only a value of +3 or −1022 to the current search coordinate.

The updating of the basic unit table information through the setting of the child units may include, when a unit, other than a horizontal line, an auto-complete horizontal line, and a vertical line, exists on the calculation coordinate obtained by adding +3 to the current search coordinate, setting the unit to be a child unit.

The updating of the basic unit table information through the setting of the child units may include, when a horizontal line appears on the calculation coordinate obtained by adding +3 to the current search coordinate, setting a value obtained by adding 3 to the current search coordinate to be a new search coordinate, and when an auto-complete horizontal line appears on the calculation coordinate obtained by adding +3 to the current search coordinate, setting a value obtained by adding 3+length value of the auto-complete horizontal line to the current search coordinate to be a new search coordinate.

The updating of the basic unit table information through the setting of the child units may include, when a vertical line appears on the calculation coordinate obtained by adding +2 to the current search coordinate, setting a value obtained by adding +1024 to the current search coordinate to be a new search coordinate, and when the vertical line appears on the calculation coordinate obtained by adding −1022 to the current search coordinate, setting a value obtained by adding −1024 to the current search coordinate to be a new search coordinate.

The extracting of the control logic information may include, when a target unit for generating a block has one child unit and a parent unit of the child unit is only the target unit, setting a block by grouping the target unit and the child unit as members that satisfy the AND condition.

The extracting of the control logic information may include, when the number of units having the same parent unit as a parent unit of a target unit for generating a block among parent units corresponding to the child units of the target unit is the same as the number of units that have the same ancestor unit as the parent unit of the target unit among parent units corresponding to the child units of the target unit, setting a block by grouping the target unit and the child unit as members that satisfy the OR condition.

BRIEF DESCRIPTION OF THE DRAWINGS

FIG. 2B is a diagram illustrating an example of XML information converted from the PLC ladder information shown in FIG. 2A.

FIG. 6B illustrates XML information converted from the PLC ladder information shown in FIG. 6A, and FIG. 6C is a table illustrating XML table information obtained by informatization of the XML information shown in FIG. 6B.

FIG. 7 is a table illustrating basic unit table information generated from the XML table information shown in FIG. 6C.

FIG. 12 is a table illustrating basic unit table information updated by the table information generation module.

FIG. 13B is a table illustrating updated basic unit table information corresponding to the block generation of FIG. 13A.

FIG. 14B is a table illustrating updated basic unit table information corresponding to the block generation of FIG. 14A.

FIG. 15B is a table illustrating updated basic unit table information corresponding to the block generation of FIG. 15A.

FIG. 16B is a table illustrating updated basic unit table information corresponding to the block generation of FIG. 16A.

FIG. 17B is a table illustrating updated basic unit table information corresponding to the block generation of FIG. 17A.

FIG. 18B is a table illustrating updated basic unit table information corresponding to the block generation of FIG. 18A.

FIG. 19B is a table illustrating updated basic unit table information corresponding to the block generation of FIG. 19A.

DETAILED DESCRIPTION

Hereinafter, exemplary embodiments of the present invention will be described in detail with reference to the attached drawings.

The embodiments of the present invention are provided to more completely explain the present invention to one of ordinary skill in the art. The following embodiments may be modified in a variety of different forms, and the scope of the present invention is not limited thereto. The embodiments are provided to make the disclosure more substantial and complete and to completely convey the concept of the present invention to those skilled in the art. Hereinafter, embodiments of the present disclosure will be described in detail with reference to the attached drawings.

Figure 1:
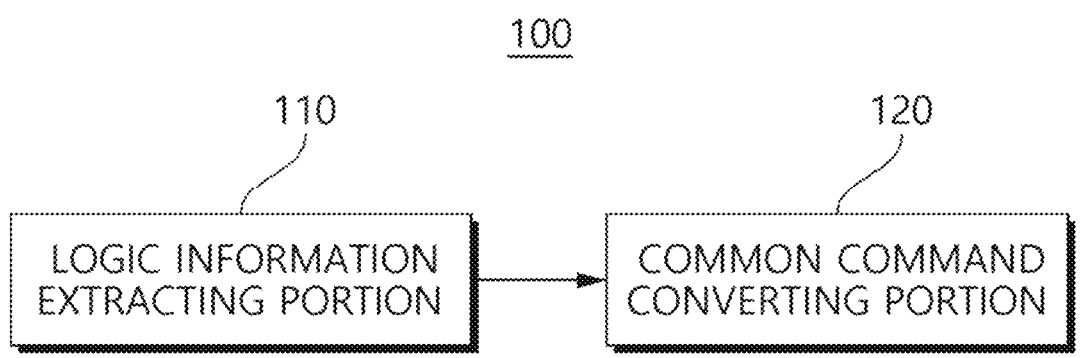
FIG. 1 is a block diagram illustrating an embodiment of an apparatus for extracting common command information from programmable logic controller (PLC) ladder information according to the present invention.

FIG. 1 is a block diagram illustrating an embodiment of an apparatus (hereinafter referred to as a common command extraction apparatus) for extracting common command information from programmable logic controller (PLC) ladder information according to the present invention.

Referring to FIG. 1, a common command extraction apparatus 100 according to the present invention includes a logic information extracting portion 110 and a common command converting portion 120.

The logic information extracting portion 110 extracts control logic information from XML information converted from PLC ladder information.

Here, the XML information includes tag information and ladder image information corresponding to the PLC ladder information. For example, the XML information may be obtained by converting each of units into an XML expression, the units including a vertical line, a horizontal line, an auto-complete horizontal line, A contact, B contact, an input pulse, NPLUS, an output contact, a closed output contact, SET, RESET, a pulse coil, an NPLUS coil, a function, and NOT.

Figure 2A:
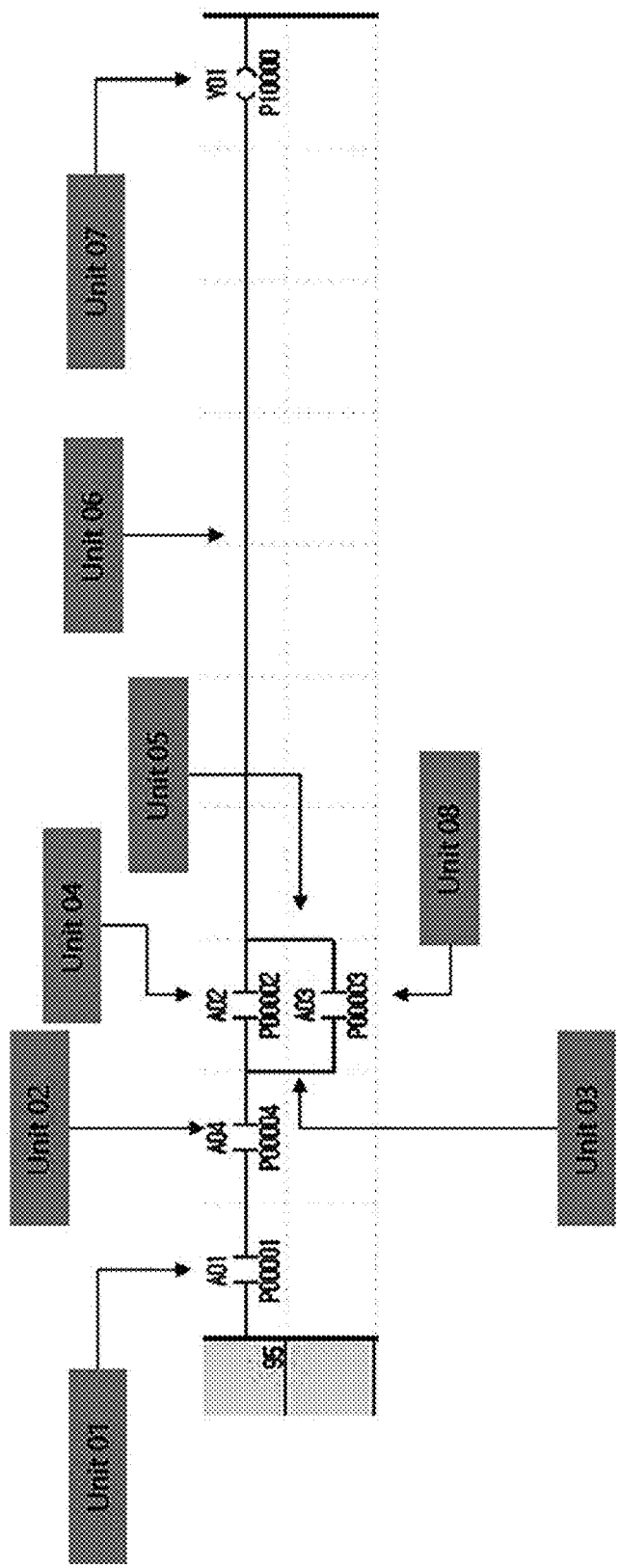
FIG. 2A illustrates PLC ladder information according to an embodiment.

FIG. 2A illustrates PLC ladder information according to an embodiment, and FIG. 2B is a diagram illustrating an example of XML information converted from the PLC ladder information shown in FIG. 2A.

Referring to FIGS. 2A and 2B, "Step" node of XML has lower nodes "Unit". Unit nodes are located as lower nodes of a step node. A unit is a basic unit when one ladder step is expressed in an image. As shown in FIG. 2B, any control logic information is not surfaced in an XML image structure.

In FIG. 2A, a contact named "A01" is generally called an "A contact", and represented as one unit. Other contacts, such as A04 and A02, are also each one unit. The above described is similar as in an existing it file. However, in the XML information, basically an image is informatized, and thus a line is processed as a unit. For example, a long horizontal line located between A02 and Y01 is one unit and two vertical lines extending down from A02 to A03 are also units. The number behind a unit is the order in which the unit appears in an XML structure.

A unit has "UnitType" attribute, "Location" attribute, and, in some cases, "Param" or "Size" attribute, and a unit whose UnitType is A or OUT has an address value Address (e.g., P00001).

Figure 3:
FIG. 3 is a table illustrating table information listing names associated with the types of units and forms expressed in XML information.
Figure 3:
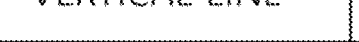
Figure 3:
Figure 3:
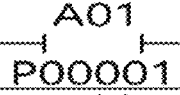
Figure 3:
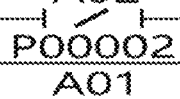
Figure 3:
Figure 3:
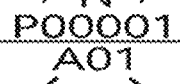
Figure 3:
Figure 3:
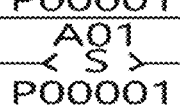
Figure 3:
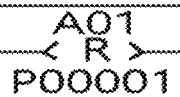
Figure 3:
Figure 3:
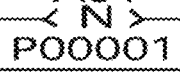
Figure 3:
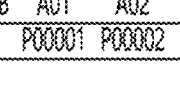
Figure 3:
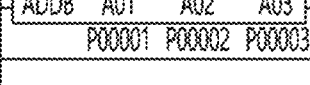
Figure 3:

FIG. 3 is a table illustrating table information listing names associated with the types of units and forms expressed in XML information.

UnitType is represented as a number in XML and is assigned according to an image type. A relationship, such as an AND condition or an OR condition, is not expressed. A horizontal line and an auto-complete horizontal line are necessary to be distinguished from each other.

Figure 4A:
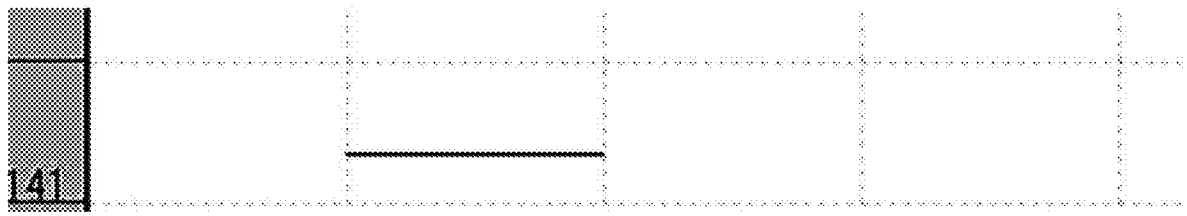
FIGS. 4A and 4B are diagrams for describing characteristics of a horizontal line among the types of units.
Figure 4B:
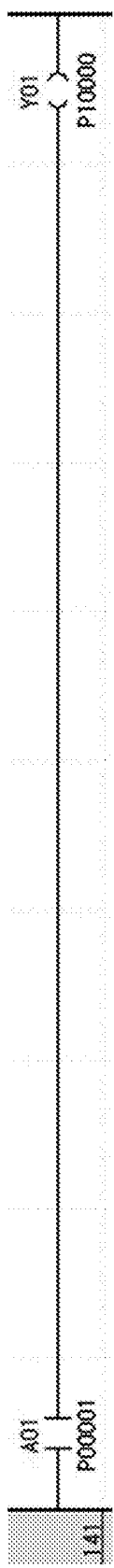

FIGS. 4A and 4B are diagrams for describing characteristics of a horizontal line among the types of units.

Referring to FIGS. 4A and 4B, there are the total of two UnitTypes indicating a horizontal line, type 1 and type 2. Type 1 corresponding to FIG. 4A is a horizontal line occupying one cell. Type 2 corresponding to FIG. 5B is an auto-complete horizontal line. In one ladder step, a contact must be located in an output portion, and the contacts in an input portion must be ultimately connected to the output contact. The input contact is "A01" and the output contact is "Y01". The two must be connected by a line. As shown in FIG. 4A, a horizontal line in units of a cell may be repeatedly inserted to connect the contacts, but there is an inconvenience of having to repeat the operation several times. Thus, when an output contact is input, an auto-complete horizontal line is created unconditionally in front of the output contact. The length of the auto-complete horizontal line depends on the situation and may have a length of 0.

Figure 4C:
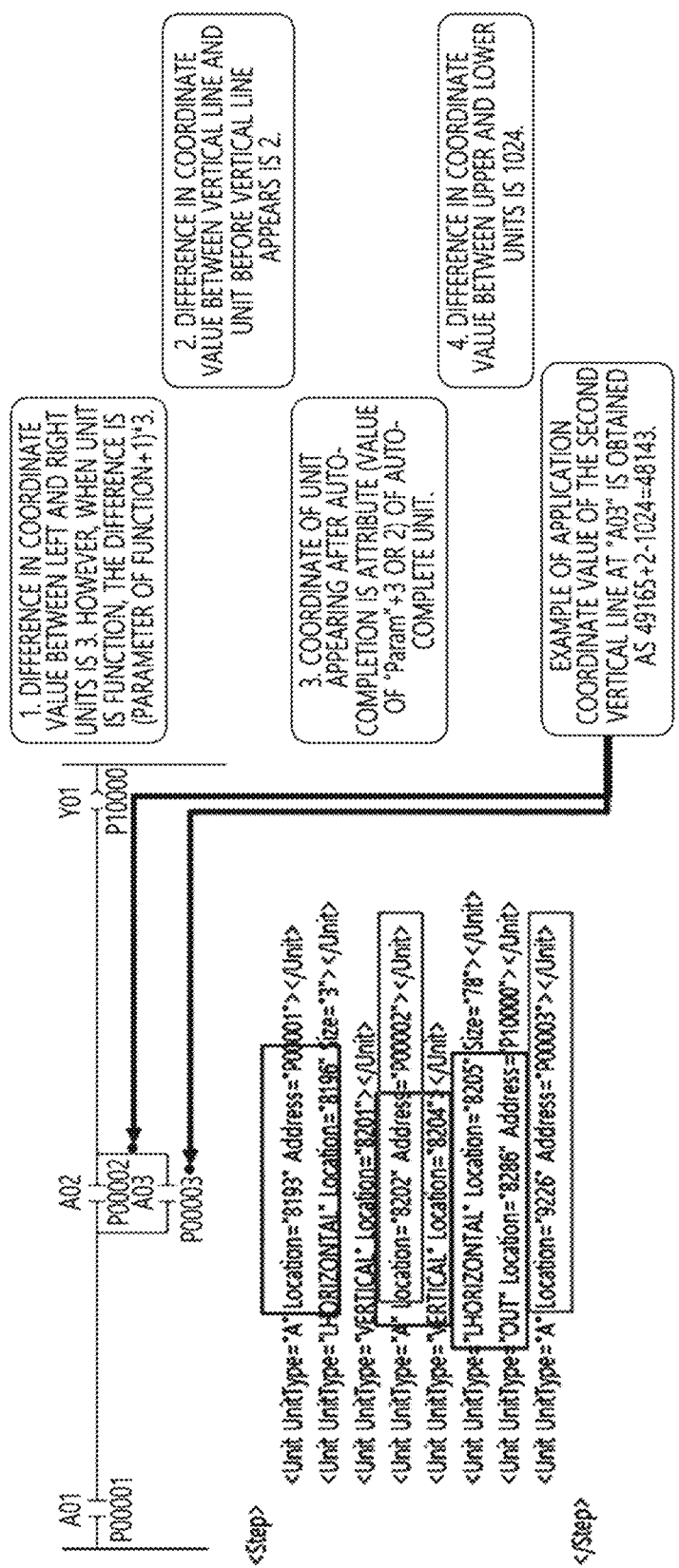
FIG. 4C is a diagram for describing an attribute for "Location" among the types of units.

FIG. 4C is a diagram for describing an attribute for "Location" among the types of units.

Referring to FIG. 4C, Location, which is a coordinate value, is information indicating where a corresponding unit is located. The following rules are applied to Location.

First, a difference in coordinate values between the left and right units is 3. However, if the unit is a function, the difference is (parameter of the function+1)*3. Second, the difference in coordinate values between a vertical line and the unit before the vertical line appears is 2. Third, the coordinates of a unit that appears after auto-completion is the attribute (value of "Param"+3 or 2) of an auto-complete unit. Fourth, a difference in coordinate values between upper and lower units is 1024. According to these rules, the coordinate value of the "second vertical line" at "A03" may be obtained as a value of 49165+2−1024=48143.

Figure 4D:
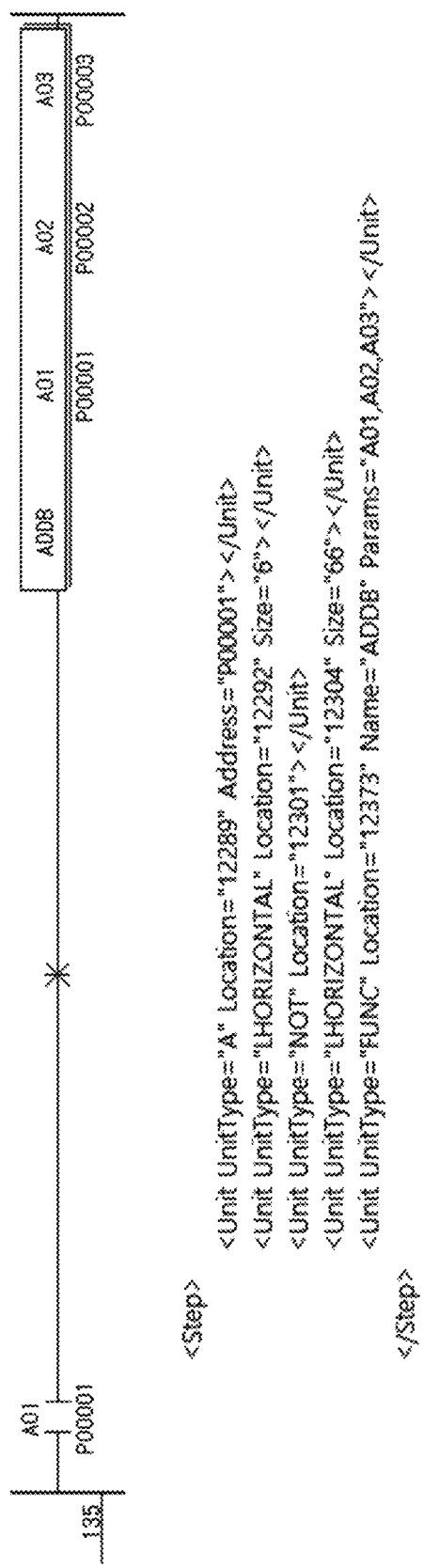
FIG. 4D is a diagram for describing attributes of "Param," "Name," and "Size" among the types of units.

FIG. 4D is a diagram for describing attributes of "Param," "Name," and "Size" among the types of units. "Param" and "Name" represent a function argument and a function name in FUNC function. In addition, "Size" indicates a length of an auto-complete horizontal line which is represented as "LHORIZONTAL".

Referring to FIG. 4D, the size of "LHORIZONTAL" unit affects a position value. The coordinates of units appearing after the auto-complete horizontal line will have a value obtained by adding 3 or 2 (2 only when a vertical line appears) to this size value.

FUNC represents an ordinary function. A function named as "ADDB" is shown in FIG. 4D, and this function requires a total of three units as an argument and a return value. Here, "A01", "A02", "A03" are used. "Params" of a unit, which is "FUNC", include these arguments. "Name" is "ADDB" which is the name of the function.

There are units having "Address", and contacts have "Address" as their own device address. In FIG. 4D, it can be seen that the first unit has its own address "P00001" as Address.

The logic information extracting portion 110 extracts, from the XML information, control logic information in the form of a block obtained by grouping units that represent contacts and lines constituting the PLC ladder information according to AND condition and OR condition.

Figure 5:
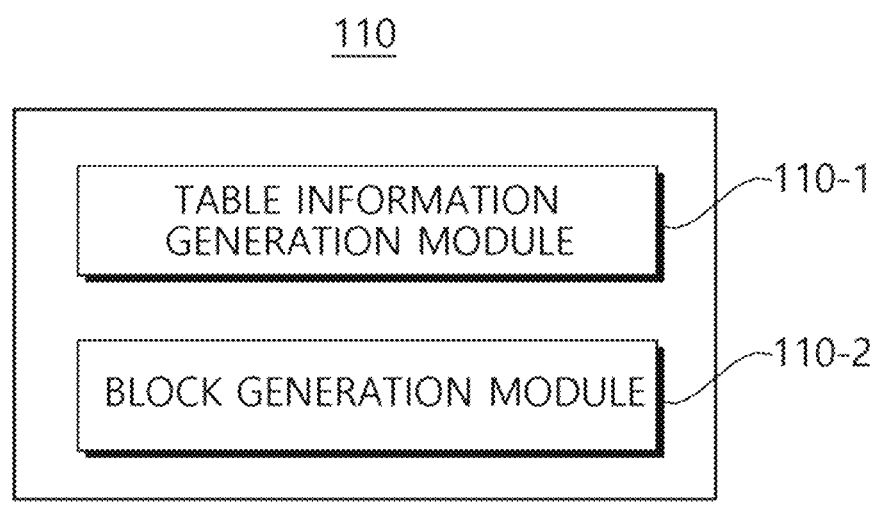
FIG. 5 is a block diagram illustrating an embodiment of a logic information extracting portion 110 shown in FIG. 1.

FIG. 5 is a block diagram illustrating an embodiment of the logic information extracting portion 110 shown in FIG. 1.

Referring to FIG. 5, the logic information extracting portion 110 includes a table information generation module 110-1 and a block generation module 110-2.

The table information generation module 110-1 generates basic unit table information on units including a contact constituting PLC ladder information from the XML information. Basic units are units other than a horizontal line, a vertical line, and an auto-complete horizontal line in the PLC ladder information.

Figure 6A:
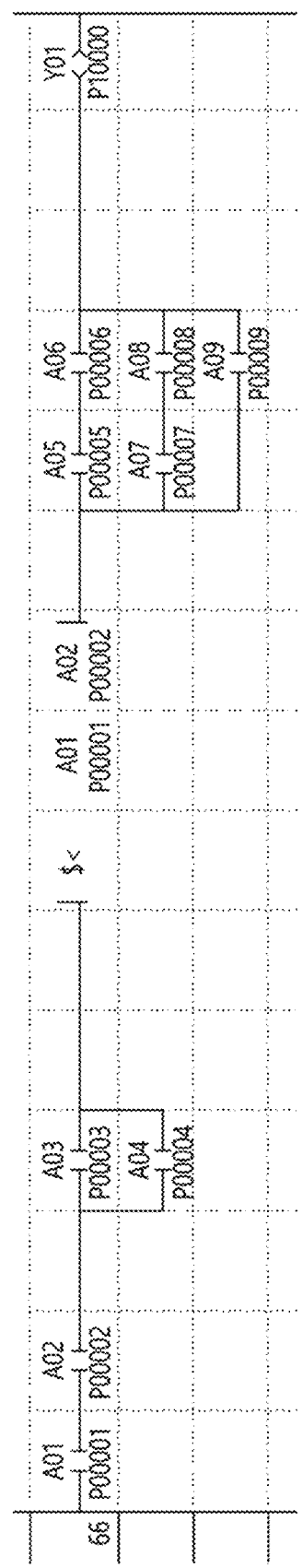
FIG. 6A illustrates PLC ladder information according to an embodiment.

FIG. 6A illustrates PLC ladder information according to an embodiment, FIG. 6B illustrates XML information converted from the PLC ladder information shown in FIG. 6A, and FIG. 6C is a table illustrating XML table information obtained by informatization of the XML information shown in FIG. 6B. As shown in FIG. 6C, XML table information includes an address value (Address), a coordinate value (Position), function status (isFunc), inclusion or exclusion of a function member (Member), a parameter value (Size/Parm), and a unit type (Type).

The table information generation module 110-1 generates basic unit table information including an address value, a coordinate value, function status, inclusion or exclusion of a function member, a parameter value, and a unit type for each basic unit from the XML table information. In this case, the table information generation module 110-1 assigns a key value (Key) to each unit included in the generated basic unit table information.

FIG. 7 is a table illustrating basic unit table information generated from the XML table information shown in FIG. 6C. As shown in FIG. 7, the basic unit table information includes key values assigned to each unit by the table information generation module 110-1.

The table information generation module 110-1 updates the basic unit table information through the setting of a child unit corresponding to a subtree structure of each unit included in the basic unit table information.

First, the table information generation module 110-1 selects a target unit and a search coordinate for setting a child unit. The first target unit may be an input contact, and the initial search coordinate is a coordinate of the target unit. However, if the target unit is a function, a value obtained by adding the number of arguments*3 to the current coordinate becomes the search coordinate of the target unit.

The table information generation module 110-1 computes a calculation coordinate by adding values of +3, +2, or −1022 to the search coordinate. However, when the current search coordinate is positioned at a lower location in an image of the XML information compared to the previous search coordinate, the table information generation module 110-1 computes the calculation coordinate by adding only a value of +3 or +2 to the current search coordinate. In addition, when the current search coordinate is positioned at an upper location in the image of the XML information compared to the previous search coordinate, the table information generation module 110-1 computes the calculation coordinate by adding only a value of +3 or −1022 to the current search coordinate.

When a unit, other than a horizontal line, an auto-complete horizontal line, and a vertical line, exists on the calculation coordinate obtained by adding +3 to the current search coordinate, the table information generation module 110-1 sets the corresponding unit to be a child unit.

Also, when a horizontal line appears on the calculation coordinate obtained by adding +3 to the current search coordinate, the table information generation module 110-1 sets a value obtained by adding 3 to the current search coordinate to be a new search coordinate.

Also, when an auto-complete horizontal line appears on the calculation coordinate obtained by adding +3 to the current search coordinate, the table information generation module 110-1 sets a value obtained by adding a value of 3+Size value to the current search coordinate to be a new search coordinate. Here, the Size value is a length value of the auto-complete horizontal line.

In addition, when a vertical line appears on the calculation coordinate obtained by adding +2 to the current search coordinate, the table information generation module 110-1 sets a value obtained by adding +1024 to the current search coordinate to be a new search coordinate.

In addition, when the vertical line appears on the calculation coordinate obtained by adding −1022 to the current search coordinate, the table information generation module 110-1 sets a value obtained by adding −1024 to the current search coordinate to be a new search coordinate.

Figure 8:
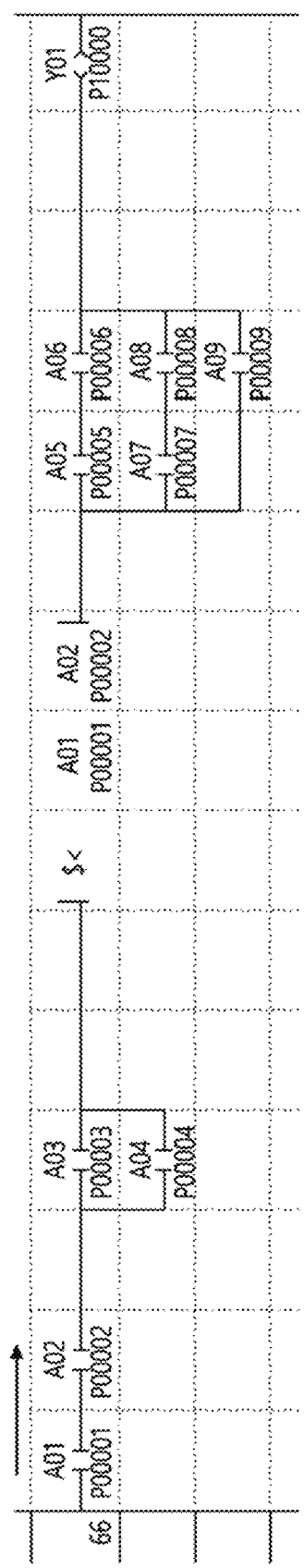
FIG. 8 is a diagram illustrating an embodiment in which a table information generation module sets a child unit using XML information.

FIG. 8 is a diagram illustrating an embodiment in which the table information generation module 110-1 sets a child unit using XML information.

Referring to FIG. 8, a search coordinate of target unit A01 is 17409, which is a coordinate of a target unit. The table information generation module 110-1 adds each of +3, +2, and −1022 to 17409. In this case, if +3 is added to 17409 and there is unit A02 that is not a horizontal line, auto-complete horizontal line, or vertical line in the coordinate corresponding to the calculation coordinate 17412, the table information generation module 110-1 sets unit A02 as a child unit of target unit A01.

Figure 9:
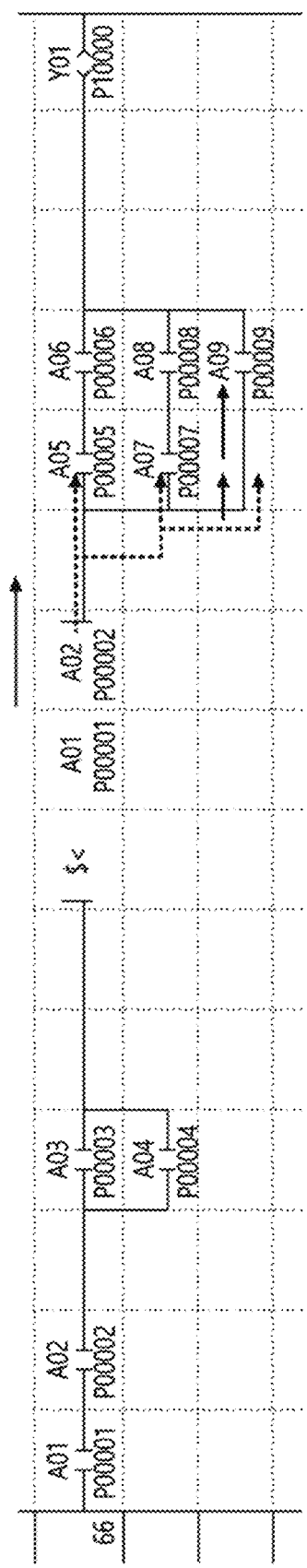
FIG. 9 is a diagram illustrating another embodiment in which the table information generation module sets a child unit using XML information.

FIG. 9 is a diagram illustrating another embodiment in which the table information generation module 110-1 sets a child unit using XML information.

Referring to FIG. 9, target unit $< is a function, and has two arguments. Accordingly, the table information generation module 110-1 sets the current coordinate of 17427+2*3=17433 as the target coordinate for target unit $<.

The table information generation module 110-1 adds each of +3, +2, and −1022 to 17433. For example, if +3 is added to 17433, a unit corresponding to a horizontal line exists at a coordinate corresponding to a calculation coordinate 17436. Since the unit corresponding to a horizontal line exists, 17436 obtained by adding 3 to the current search coordinate 17433 is set to be a new search coordinate.

The table information generation module 110-1 adds each of +3, +2, and −1022 to 17436 that is the new search coordinate. For example, when +3 is added to 17436, unit A05 exists on a coordinate corresponding to a calculation coordinate 17439. Since unit A05 is not a horizontal line, an auto-complete horizontal line, or a vertical line, the table information generation module 110-1 sets unit A05 to be a child unit of target unit $<.

In addition, when +2 is added to 17436, a unit corresponding to a vertical line exists on a coordinate corresponding to a calculation coordinate 17438. Since a vertical line exists on the calculation coordinate, the table information generation module 110-1 sets a value of 18460 obtained by adding 1024 to the current search coordinate 17436 to be a new search coordinate.

Since the current search coordinate 18640 is positioned at a lower location in the image of the XML information compared to the previous search coordinate 17436, the table information generation module 110-1 computes the calculation coordinate by adding only a value of +3 or +2 to the current search coordinate 18640.

When 3 is added to the current search coordinate 18640, unit A07 exists on a coordinate corresponding to a calculation coordinate 18643. Since unit A07 is not a horizontal line, an auto-complete horizontal line, or a vertical line, the table information generation module 110-1 sets unit A07 to be a child unit of target unit $<.

In addition, when +2 is added to the current search coordinate 18460, a unit corresponding to a vertical line exists on a coordinate corresponding to a calculation coordinate 18462. Since a vertical line exists on the calculation coordinate, the table information generation module 110-1 sets a value of 19484 obtained by adding +1024 to the current search coordinate 18460 to be a new search coordinate.

Since the current search coordinate 19484 is positioned at a lower location in the image of the XML information compared to the previous search coordinate 18460, the table information generation module 110-1 computes the calculation coordinate by adding only a value of +3 or +2 to the current search coordinate 19484. When +3 is added, a horizontal line exists, and when +2 is added, a horizontal line does not exist.

Thus, when +3 is added to the current search coordinate 19484, a unit corresponding to a horizontal line exists on a calculation coordinate 19487. Since a horizontal line exists on the calculation coordinate, the table information generation module 110-1 sets a value of 19487 obtained by adding +3 to the current search coordinate 19484 to be a new search coordinate.

The table information generation module 110-1 computes the calculation coordinate by adding a value of +3, +2, or −1022 to the new search coordinate 19487. According to this, a unit exists as a result of adding +3, and as a result of adding each of +2 and −1022, a unit does not exist.

When +3 is added to the new search coordinate 19487, unit A09 exists on a coordinate corresponding to a calculation coordinate 18490. Since unit A09 is not a horizontal line, an auto-complete horizontal line, or a vertical line, the table information generation module 110-1 sets unit A09 to be a child unit of target unit $<.

Figure 10:
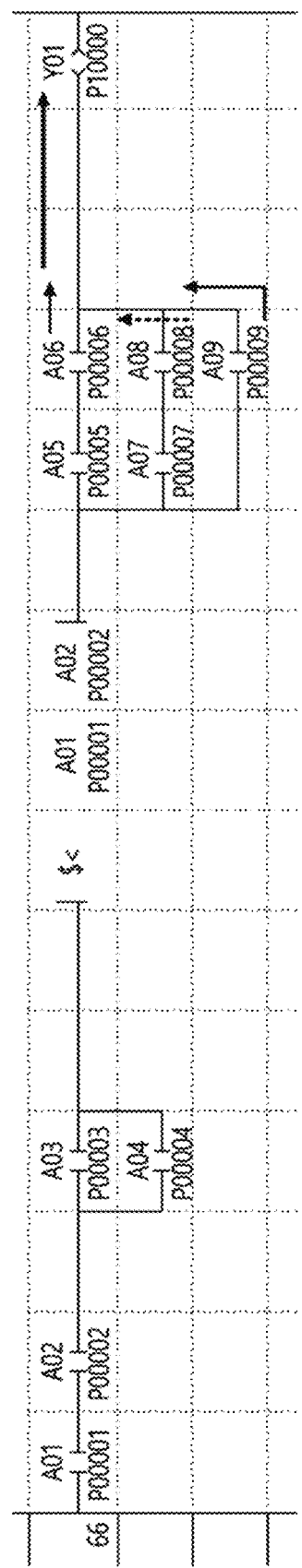
FIG. 10 is a diagram illustrating another embodiment in which the table information generation module sets a child unit using XML information.

FIG. 10 is a diagram illustrating another embodiment in which the table information generation module 110-1 sets a child unit using XML information.

Referring to FIG. 10, a target unit is A09, and a search coordinate of target unit A09 is 19490.

The table information generation module 110-1 adds each of +3, +2, and −1022 to the search coordinate 19490. For example, when −1022 is added to 19490, a unit corresponding a vertical line exists on a calculation coordinate 18468. Since a vertical line exists on the calculation coordinate 18468, the table information generation module 110-1 sets a value of 18466 obtained by adding −1024 to the current search coordinate 19490 to be a new search coordinate.

Since the current search coordinate 18466 is positioned at an upper location in the image of the XML information compared to the previous search coordinate 19490, the table information generation module 110-1 computes the calculation coordinate by adding only a value of +3 or −1022 to the current search coordinate 18466. When −1022 is added, a vertical line exists, and when +3 is added, a vertical line does not exist.

That is, a unit corresponding to a vertical line exists on a calculation coordinate 17444 obtained by adding −1022 to the current search coordinate 18466. Since a vertical line exists on the calculation coordinate, the table information generation module 110-1 sets a value of 17442 obtained by adding −1024 to the current search coordinate 18466 to be a new search coordinate.

Since the current search coordinate 17442 is positioned at an upper location in the image of the XML information compared to the previous search coordinate 18466, the table information generation module 110-1 computes the calculation coordinate by adding only a value of +3 or −1022 to the current search coordinate 17442. When +3 is added, an auto-complete horizontal line exists, and when −1022 is added, the auto-complete horizontal line does not exist.

That is, a unit corresponding to the auto-complete horizontal line exists on a calculation coordinate 17445 obtained by adding +3 to the current search coordinate 17442. Since the auto-complete horizontal line exists on the calculation coordinate, the table information generation module 110-1 sets a value of 17499 obtained by adding a value of 3+size value (e.g., 54) to the current search coordinate 17442 to be a new search coordinate.

The table information generation module 110-1 computes the calculation coordinate by adding a value of +3, +2, or −1022 to the new search coordinate 17499. According to this, a unit exists as a result of adding +3, and as a result of adding each of +2 and −1022, a unit does not exist. When +3 is added to the new search coordinate 17499, unit Y01 exists on a coordinate corresponding to a calculation coordinate 17502. Since unit Y01 is not a horizontal line, an auto-complete horizontal line, or a vertical line, the table information generation module 110-1 sets unit Y01 to be a child unit of target unit A09.

Figure 11:
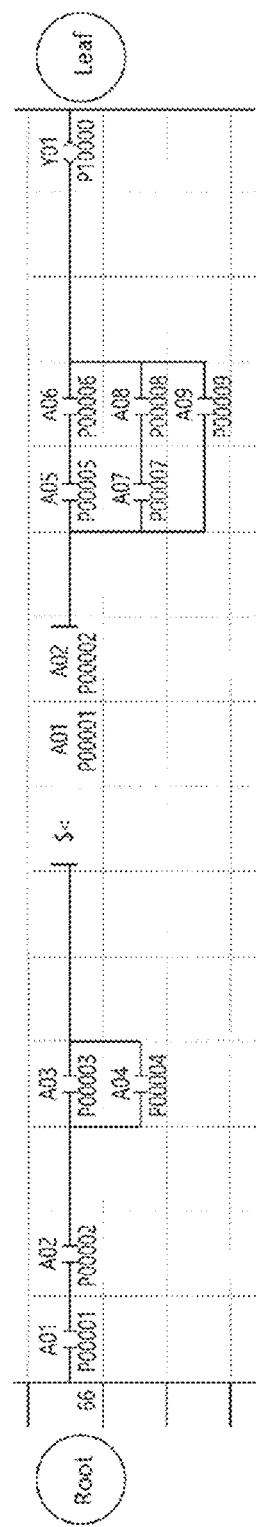
FIG. 11 is a diagram illustrating an embodiment in which the table information generation module sets a parent unit using basic unit table information.

The table information generation module 110-1 updates the basic unit table information through the setting of corresponding parent units based on the set child units. FIG. 11 is a diagram illustrating an embodiment in which the table information generation module 110-1 sets a parent unit using the basic unit table information.

Referring to FIG. 11, the table information generation module 110-1 confirms that A03 and A04 exist as child units of A02 through the basic unit table information. Thus, the table information generation module 110-1 may set parent unit A02 based on the child units A03 and A04 set in the basic unit table, and may update the basic unit table information to this setting. In addition, the table information generation module 110-1 may confirm that Y01 exists as a child node of A06, A08, and A09. Thus, the table information generation module 110-1 may set each of parent units A06, A08, and A09 based on the child unit Y01 set in the basic unit table, and may update the basic unit table information to this setting.

Thereafter, the table information generation module 110-1 sets a root unit connected to unit A01 corresponding to an input contact of the PLC ladder information, and sets a leaf unit connected to unit Y01 corresponding to an output contact of the PLC ladder information.

As shown in FIG. 11, the table information generation module 110-1 sets a child unit and a parent unit for a root unit and sets a parent node of a leaf unit. That is, the table information generation module 110-1 sets the root unit to be a parent unit of a unit that does not have a parent unit, and sets the leaf unit to be a child unit of a unit that does not have a child unit.

FIG. 12 is a table illustrating basic unit table information updated by the table information generation module 110-1. Referring to FIG. 12, it can be seen that a root unit and a leaf unit, along with all child units and parent units, are set in the basic unit table information.

The block generation module 110-2 sets a block by grouping the units to satisfy an AND condition or an OR condition, according to the relationship between the child units and the parent units, and repeats this operation until one final block is generated from the set blocks. After determining a target unit, the block generation module 110-2 repeats a process of generating a block by testing the AND condition for the target unit, followed by generating a block by testing the OR condition.

When the target unit for generating a block has one child unit and a parent unit of the corresponding child unit is only the target unit, the block generation module 110-2 sets the block by grouping the corresponding target unit and the child unit as members that satisfy the AND condition.

The block generation module 110-2 obtains the number (a) of units having the same parent unit as the parent unit of a target unit among the parent units corresponding to the child units of the target unit for generating a block. In addition, the block generation module 110-1 obtains the number (b) of units having the same ancestor unit as the parent unit of a target unit among the parent units corresponding to the child units of the target unit.

When the number (a) of units is the same as the number (b) of units, the block generation module 110-2 sets a block by grouping the target unit and the child unit as members that satisfy the OR condition. Here, the ancestor unit of a specific unit includes all units connected by a line from the parent unit of the specific unit to the root unit.

For example, the block generation module 110-2 starts an AND test on a target unit whose key value is ANB 0 by using the basic unit table information as shown in FIG. 12. According to this, since ANB 0 has one child unit which corresponds to ANB 1 and ANB 1 has one parent unit which corresponds to ANB 0, the block generation module 110-2 adds ANB 0 to AND members and sets ANB 1 to be a target unit for the AND test. Since ANB 1 has many child units, the table information generation module 110-1 adds ANB 1 to the AND members and terminates the AND test.

Figure 13A:
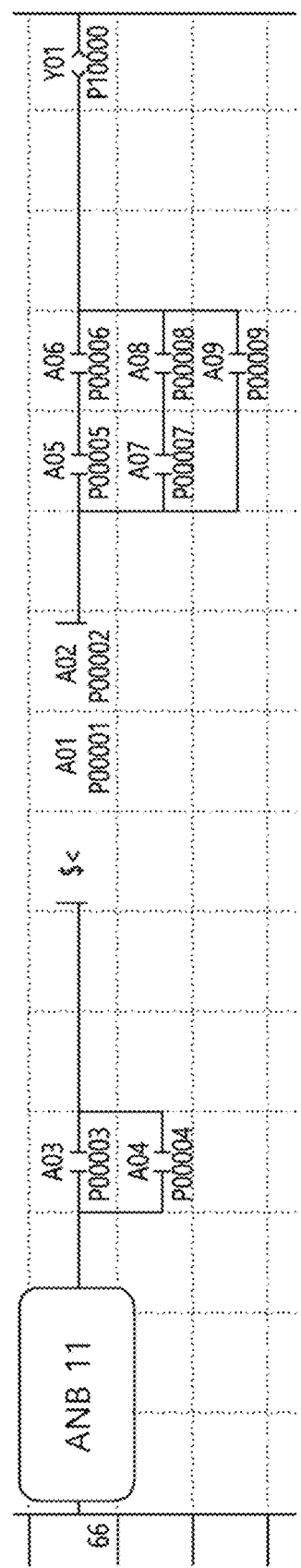
FIG. 13A is a diagram illustrating an embodiment of an imaged state of a block generated by a block generation module.

FIG. 13A is a diagram illustrating an embodiment of an imaged state of a block generated by the block generation module 110-2, and FIG. 13B is a table illustrating updated basic unit table information corresponding to the block generation of FIG. 13A.

Referring to FIGS. 13A and 13B, the block generation module 110-2 generates ANB 11 that is an AND block corresponding to a new key value by using objects corresponding to the AND members, deletes the objects that are included in the AND members from the basic unit table information, and adds ANB 11 to the basic unit table information. The block generation module 110-2 initializes all relations associated with ANB 11.

Then, the block generation module 110-2 starts an AND test and an OR test to classify ANB 11 into a block. As a result of the AND test on ANB 11, there is no unit satisfying the AND condition, and as a result of the OR test on ANB 11, there is also no unit satisfying the OR condition.

In this case, the block generation module 110-2 performs the AND test and the OR test on ANB 2 (A03) which is the first child unit. The block generation module 110-2 confirms that there is no unit satisfying the AND condition as a result of the AND test on ANB 2.

Thereafter, the block generation module 110-2 performs the OR test on ANB 2. A child unit of ANB 2 is ANB 3($<$), and ANB 3 has ANB 7 as a parent unit, besides ANB 2. In addition, a parent unit of ANB 7 is ANB 11. This is the same as the parent unit of ANB 2. An ancestor unit of ANB 7 is also ANB 11, which is the same as the parent unit of ANB 2. Therefore, the block generation module 110-2 confirms that ANB 2 and ANB 7 satisfy the OR condition.

Figure 14A:
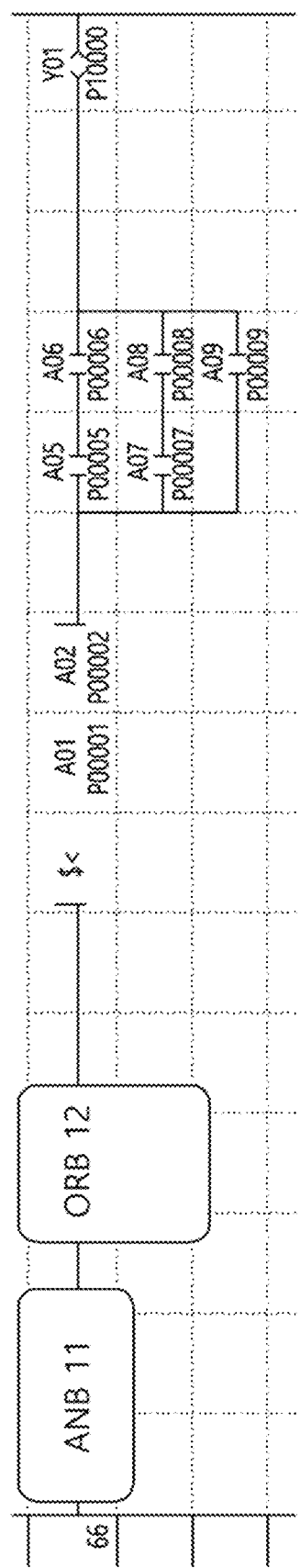
FIG. 14A is a diagram illustrating an embodiment of an imaged state of a block generated by the block generation module.

FIG. 14A is a diagram illustrating an embodiment of an imaged state of a block generated by the block generation module 110-2, and FIG. 14B is a table illustrating updated basic unit table information corresponding to the block generation of FIG. 14A.

Referring to FIGS. 14A and 14B, the block generation module 110-2 generates ORB 12 that is an OR block corresponding to a new key value by using objects included in the OR members. The block generation module 110-2 deletes the objects that are included in the OR members from the basic unit table information, and adds ORB 12 to the basic unit table information. The block generation module 110-2 initializes all relations associated with ORB 12.

Then, the block generation module 110-2 starts the AND test and the OR test to classify ORB 12 into a block. ORB 12 has one parent unit which is ANB 11. Also, ANB 11 has one child unit which is ORB 12. Thus, the block generation module 110-2 adds ANB 11 to the AND members.

Meanwhile, ORB 12 has one child unit which is ANB 3($<$). ANB 3 also has one parent unit which is ORB 12. Accordingly, the block generation module 110-2 sets ORB 12 to be an AND member, and then perform a test on ANB 3. ANB 3 has several child units. Thus, the block generation module 110-2 adds ANB 3 to the AND members and terminates the AND test.

Figure 15A:
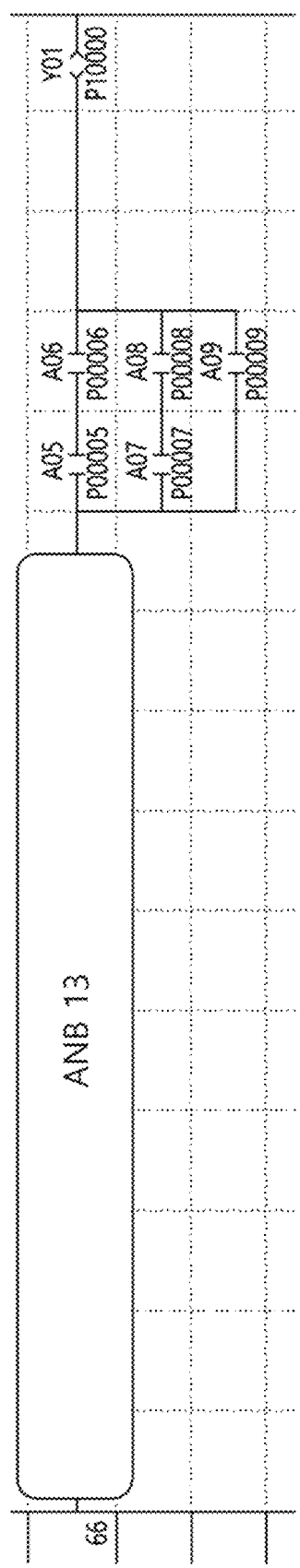
FIG. 15A is a diagram illustrating an embodiment of an imaged state of a block generated by the block generation module.

FIG. 15A is a diagram illustrating an embodiment of an imaged state of a block generated by the block generation module 110-2, and FIG. 15B is a table illustrating updated basic unit table information corresponding to the block generation of FIG. 15A.

Referring to FIGS. 15A and 15B, the block generation module 110-2 generates ANB 13 that is an AND block corresponding to a new key value by using objects of the AND members. The block generation module 110-2 deletes the objects that are included in the AND members from the basic unit table information, and adds ANB 13 to the basic unit table information. The block generation module 110-2 initializes all relations associated with ANB 13.

Then, the block generation module 110-2 starts an AND test and an OR test to classify ANB 13 into a block. As a result of the AND test on ANB 13, there is no unit satisfying the AND condition, and as a result of the OR test on ANB 13, there is also no unit satisfying the OR condition.

In this case, the block generation module 110-2 performs the AND test and the OR test on ANB 4 (A05) which is the first child unit. Since ANB 4 has one child unit which is ANB 5 and ANB 5 has one parent unit which is ANB 4, the block generation module 110-2 adds ANB 4 to the AND members and performs a test on ANB 5. ANB 5 has one child unit which is ANB 6. However, ANB 6 has many parent units. Thus, the block generation module 110-2 adds ANB 5 to the AND members and terminates the AND test.

Figure 16A:
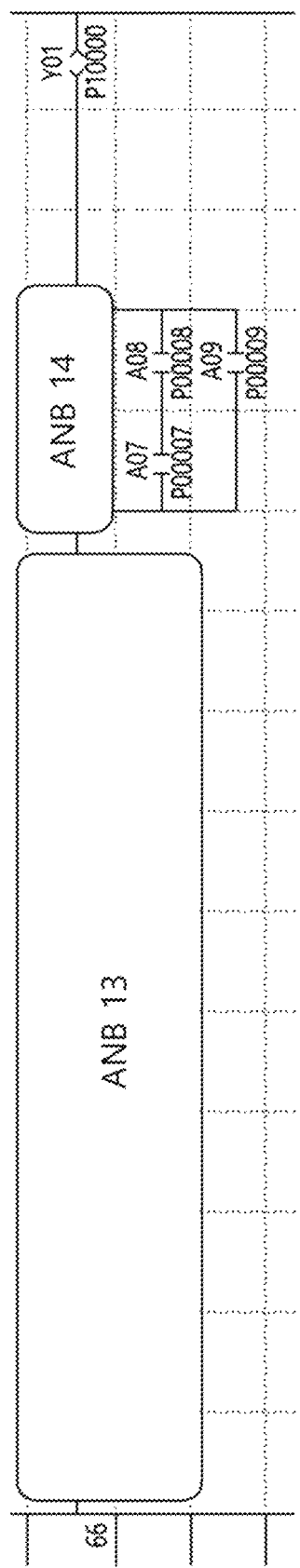
FIG. 16A is a diagram illustrating an embodiment of an imaged state of a block generated by the block generation module.

FIG. 16A is a diagram illustrating an embodiment of an imaged state of a block generated by the block generation module 110-2, and FIG. 16B is a table illustrating updated basic unit table information corresponding to the block generation of FIG. 16A.

Referring to FIGS. 16A and 16B, the block generation module 110-2 generates ANB 14 that is an AND block by using objects included in the AND members. The block generation module 110-2 deletes the objects that are included in the AND members from the basic unit table information, and adds ANB 14 to the basic unit table information. The block generation module 110-2 initializes all relations associated with ANB 14.

Then, the block generation module 110-2 starts the AND test and the OR test to classify ANB 14 into a block.

There is no unit that satisfies, together with ANB 14, the AND condition. ANB 6, which is a child unit of ANB 14, has ANB 9 and ANB 10 as its parent units, besides ANB 14. Among these units, ANB 10 has the same parent unit as that of ANB 14. Ancestor units of ANB 9 and ANB 10 are the same as the parent unit of ANB 14. Since the numbers of units satisfying the two cases are different, there is also no unit that satisfies the OR condition.

In this case, the block generation module 110-2 performs the AND test and the OR test on ANB 6 which is a child unit of ANB 14.

Since a child unit of ANB 6 is a leaf unit, there is no unit that satisfies the AND condition and the OR condition. In addition, there is no other child unit besides the leaf unit, the block generation module 110-2 returns to ANB 14. Since ANB 14 has one child, the block generation module 110-2 returns to ANB 13.

Thereafter, the block generation module 110-2 performs the AND test and the OR test on ANB 8 which is the second child unit.

Since ANB 8 has one child unit which is ANB 9 and ANB 9 also has one parent which is ANB 8, the AND condition is satisfied. The block generation module 110-2 adds ANB 8 to the AND members and then performs the AND test on ANB 9. Since AND 9 has one child unit which is Y01 but Y01 has many parent units, the block generation module 110-2 terminates the test and adds AND 9 to the AND members.

Figure 17A:
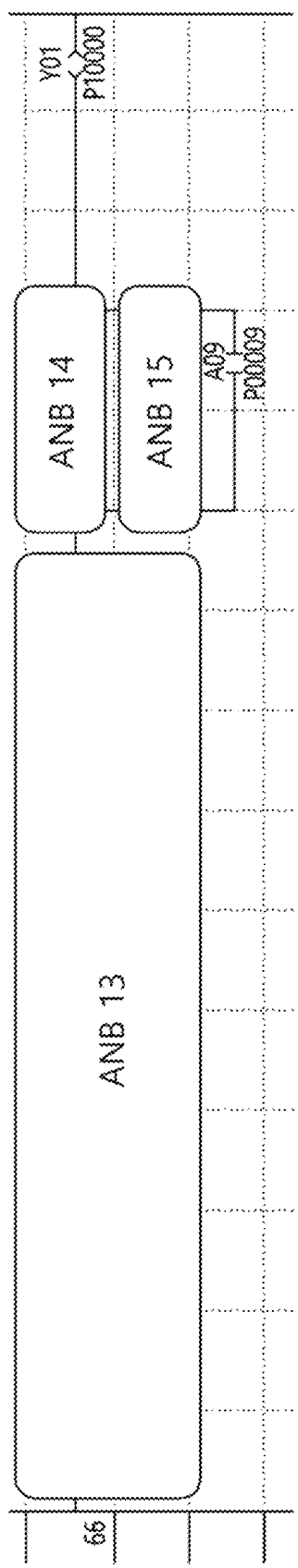
FIG. 17A is a diagram illustrating an embodiment of an imaged state of a block generated by the block generation module.

FIG. 17A is a diagram illustrating an embodiment of an imaged state of a block generated by the block generation module 110-2, and FIG. 17B is a table illustrating updated basic unit table information corresponding to the block generation of FIG. 17A.

Referring to FIGS. 17A and 17B, the block generation module 110-2 generates ANB 15 that is an AND block by using objects of the AND members. The block generation module 110-2 deletes the objects that are included in the AND members from the basic unit table information, and adds ANB 15 to the basic unit table information. The block generation module 110-2 initializes all relations associated with ANB 15.

Then, the block generation module 110-2 starts the AND test and the OR test to classify ANB 15 into a block.

There is no unit that satisfies the AND condition when the AND test is performed on ANB 15. The block generation module 110-2 performs the OR test on ANB 15. Among the parents units of ANB 6, which is a child unit of ANB 15, parent units of ANB 9 and ANB 10, other than ANB 15, are the same as the parent unit of ANB 15. Also, ancestor units of ANB 9 and ANB 10 are also the same as the parent unit of ANB 15. Thus, the block generation module 110-2 adds ANB 14, ANB 15, and ANB 10 to the OR members.

Figure 18A:
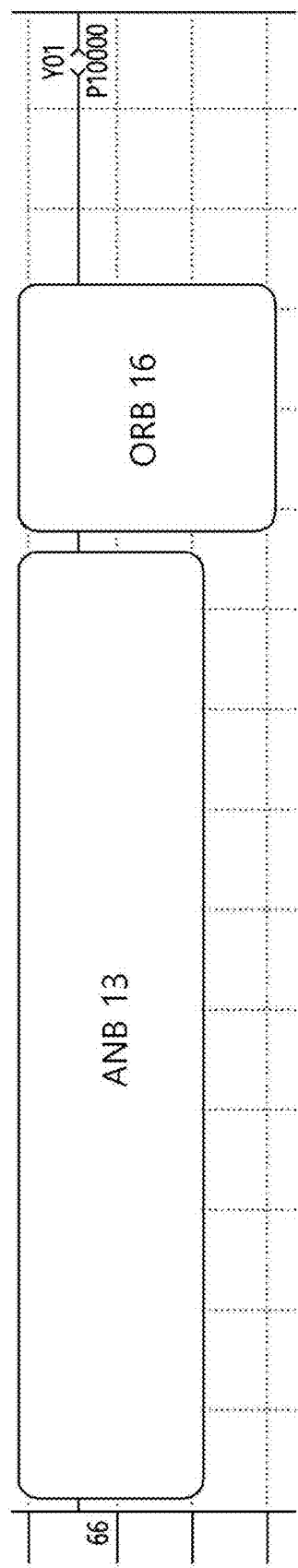
FIG. 18A is a diagram illustrating an embodiment of an imaged state of a block generated by the block generation module.

FIG. 18A is a diagram illustrating an embodiment of an imaged state of a block generated by the block generation module 110-2, and FIG. 18B is a table illustrating updated basic unit table information corresponding to the block generation of FIG. 18A.

Referring to FIGS. 18A and 18B, the block generation module 110-2 generates ORB 16 that is an OR block by using objects included in the OR members. The block generation module 110-2 deletes the objects that are included in the OR members from the basic unit table information, and adds ORB 16 to the basic unit table information. The block generation module 110-2 initializes all relations associated with ORB 16.

Then, the block generation module 110-2 starts the AND test and the OR test to classify ORB 16 into a block.

ORB 16 has one parent unit which is ANB 13. ANB 13 also has one child unit which is ORB 16. Thus, the block generation module 110-2 adds ANB 13 to the AND members. ORB 16 has one parent unit which is ANB 6, and ANB 6 has one parent unit which is ORB 16. Accordingly, the block generation module 110-2 sets ORB 16 to be an AND member, and then perform a test on ANB 6. ANB 6 has no child unit. Accordingly, the block generation module 110-2 terminates the test and adds ANB 6 to the ORB members.

Figure 19A:
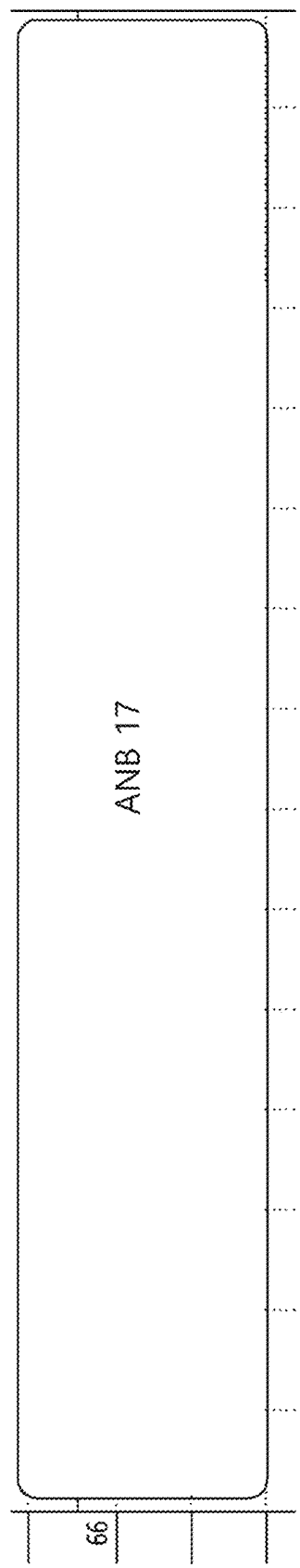
FIG. 19A is a diagram illustrating an embodiment of an imaged state of a block generated by the block generation module.

FIG. 19A is a diagram illustrating an embodiment of an imaged state of a block generated by the block generation module 110-2, and FIG. 19B is a table illustrating updated basic unit table information corresponding to the block generation of FIG. 19A.

Referring to FIGS. 19A and 19B, the block generation module 110-2 terminates the test since one unit ANB 17 is finally left. Then, the block generation module 110-2 deletes the root unit and the leaf unit from the basic unit table information.

The common command converting portion 120 converts the control logic information extracted by the control logic information extracting portion 110 into common command information. The common command information is a language system for interpreting control logic information. The common command information is information for interpreting control logic expressions that are different from one PLC manufacture to another into the same language system. When all tag information and logic information are converted into one common command information, control logics of all PLC manufacturers can be understood on a system by interpreting the common command information.

To this end, the common command converting portion 120 may include a program for converting control logic information classified into blocks into common command information. Information for conversion provided to the common command converting portion 120 is control logic information classified into blocks.

Figure 20:
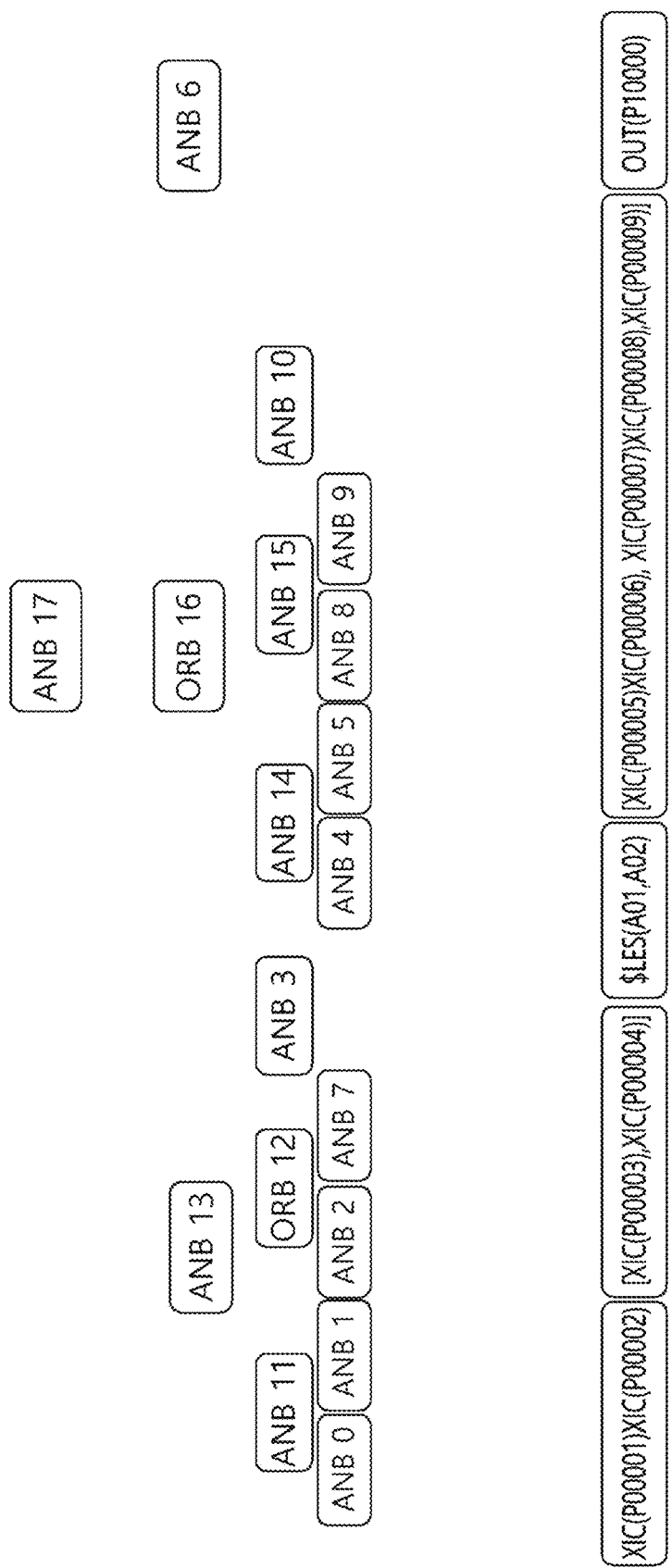
FIG. 20 is a diagram illustrating a state in which control logic information is converted into common command information by a common command converting portion

FIG. 20 is a diagram illustrating a state in which control logic information is converted into common command information by the common command converting portion 120.

Referring to FIG. 20, the common command converting portion 120 applies a block of the control logic information in the form of a block to a decomposition function. The common command converting portion 120 extracts the number of members if the control logic information is an ANB block according to the AND condition. When the number of members of the ANB block is one, the common command converting portion 120 returns common command instruction and address of a contact. On the other hand, when the number of members of the ANB block is two or more, the common command converting portion 120 applies the decomposition function to each member, and adds the result to a string.

When the control logic information is an ORB block according to the OR condition, the common command converting portion 120 applies the decomposition function to members of the ORB block, separates the result by ",", and then adds the separated result to a string. Thereafter, the common command converting portion 120 returns a completed string by binding the string with "[" and "]" at the end.

In this way, the common command converting portion 120 converts the control logic information classified into blocks into common command information so that the tag information and ladder image information of the PLC ladder information can be stored and managed as one file information.

Figure 21:
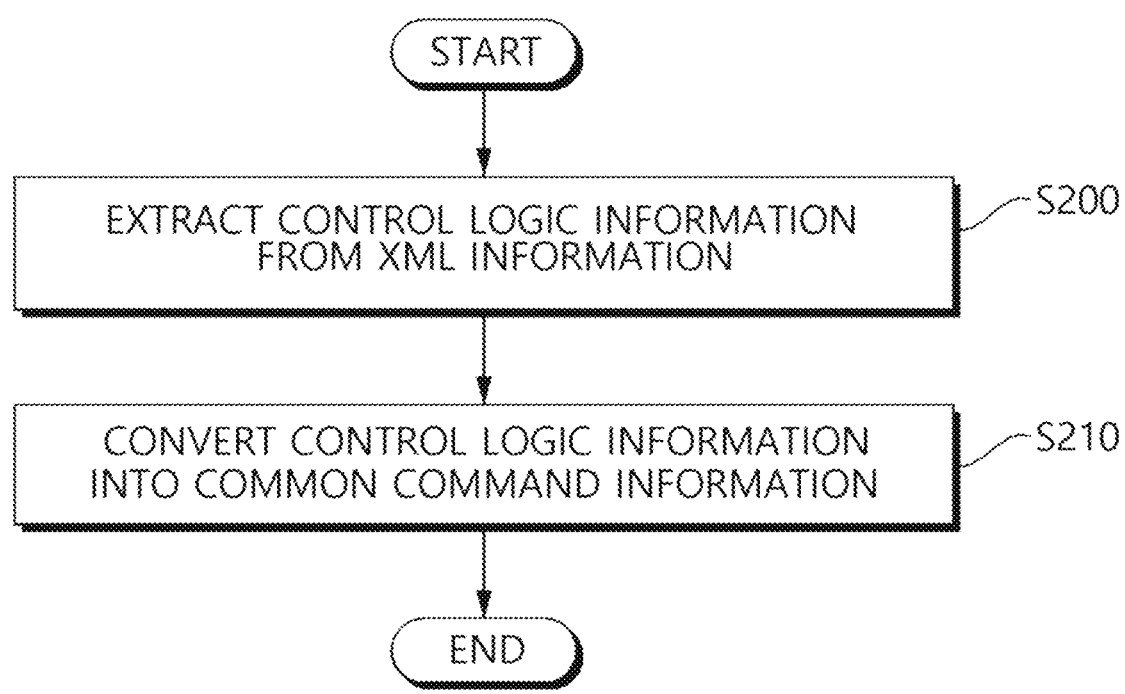
FIG. 21 is a flowchart illustrating a method of extracting common command information from PLC ladder information according to the present invention.

FIG. 21 is a flowchart illustrating a method of extracting common command information from PLC ladder information according to the present invention.

First, control logic information is extracted from XML information converted from PLC ladder information (operation S200). In the operation of extracting the control logic information, the control logic information in the form of a block obtained by grouping units that respectively represent contacts and lines constituting the PLC ladder information according to an AND condition and an OR condition is extracted from the XML information.

Figure 22:
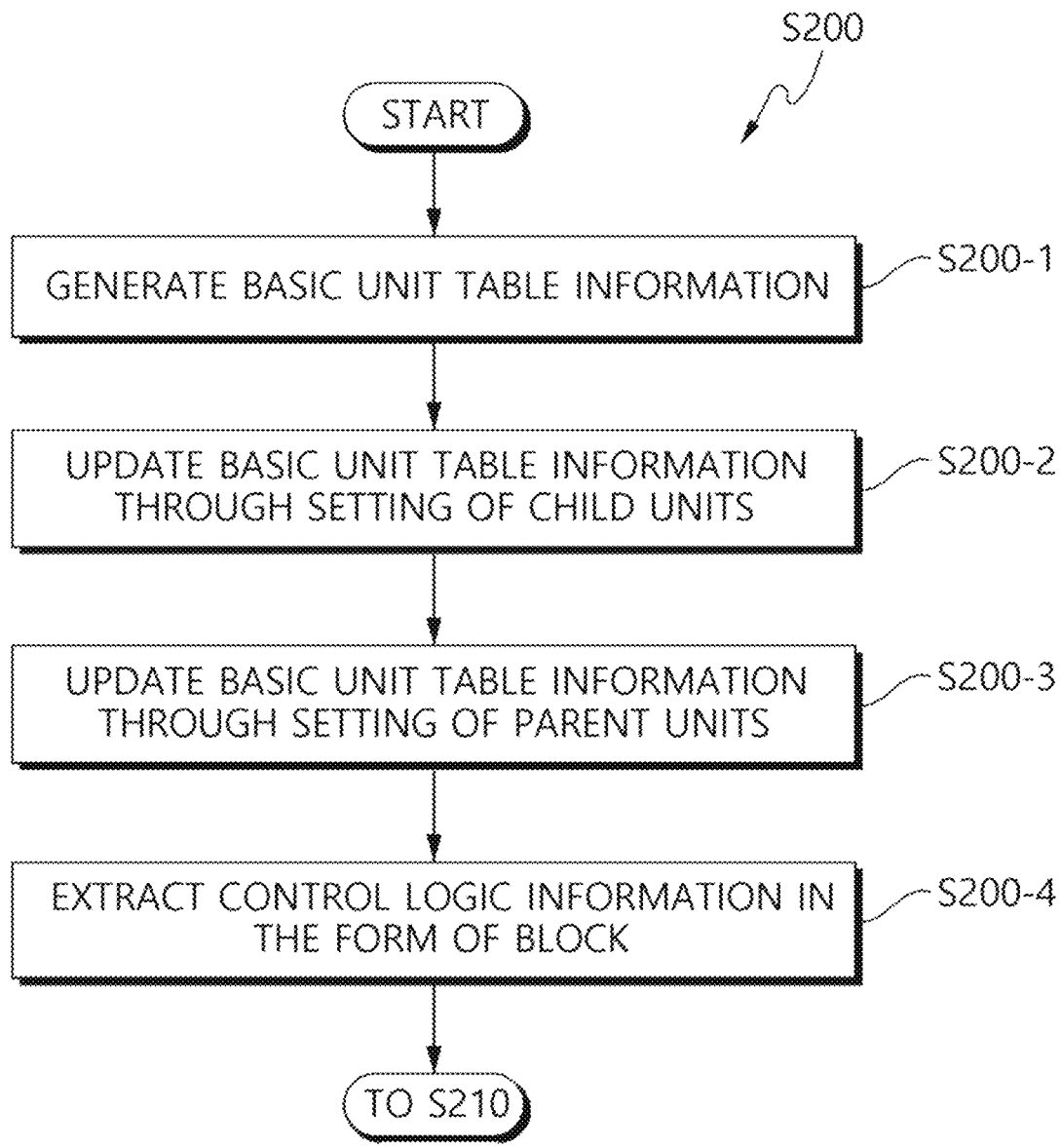
FIG. 22 is a flowchart illustrating an operation of extracting the control logic information shown in FIG. 21.

FIG. 22 is a flowchart illustrating an operation of extracting the control logic information shown in FIG. 21.

Basic unit table information on units including a contact constituting the PLC ladder information is generated from XML information (operation S200-1). Basic units are units other than a horizontal line, a vertical line, and an auto-complete horizontal line in the PLC ladder information. The table information generation module 110-1 generates basic unit table information including an address value, a coordinate value, function status, inclusion or exclusion of a function member, a parameter value, and a unit type for each basic unit from the XML table information. In this case, a key value (Key) is assigned to each unit included in the basic unit table information.

After operation S200-1, the basic unit table information is updated through the setting of each child unit corresponding to a subtree structure of each unit included in the basic unit table information by using the XML information (operation S200-2).

A target unit and a search coordinate are selected for setting a child unit. The first target unit may be an input contact, and the initial search coordinate is a coordinate of the target unit. However, if the target unit is a function, a value obtained by adding the number of arguments*3 to the current coordinate becomes the search coordinate of the target unit.

In the operation of updating the basic unit table information through the setting of each child unit, the target unit and the search coordinate are selected for setting the child units, and a calculation coordinate is computed by adding values of +3, +2, and −1022 to the search coordinate.

Also, in the operation of updating the basic unit table information through the setting of each child unit, when the current search coordinate is positioned at a lower location in an image of the XML information compared to the previous search coordinate, a calculation coordinate is computed by adding only a value of +3 or +2 to the current search coordinate. When the current search coordinate is positioned at an upper location in the image of the XML information compared to the previous search coordinate, a calculation coordinate is computed by adding only a value of +3 or −1022 to the current search coordinate.

In addition, in the operation of updating the basic unit table information through the setting of each child unit, when a unit, other than a horizontal line, an auto-complete horizontal line, and a vertical line, exists on a calculation coordinate obtained by adding +3 to the current search coordinate, the corresponding unit is set to be a child unit.

In the operation of updating the basic unit table information through the setting of each child unit, when a horizontal line appears on a calculation coordinate obtained by adding +3 to the current search coordinate, a value obtained by adding 3 to the current search coordinate is set to be a new search coordinate, and when an auto-complete horizontal line appears on a calculation coordinate obtained by adding +3 to the current search coordinate, a value obtained by adding a value of 3+length value of the auto-complete horizontal line to the current search coordinate is set to be a new search coordinate.

Additionally, in the operation of updating the basic unit table information through the setting of each child unit, when a vertical line appears on a calculation coordinate obtained by adding +2 to the current search coordinate, a value obtained by adding +1024 to the current search coordinate is set to be a new search coordinate, and when the vertical line appears on a calculation coordinate obtained by adding −1022 to the current search coordinate, a value obtained by adding −1024 to the current search coordinate is set to be a new search coordinate.

After operation S200-2, the basic unit table information is updated through the setting of parent units corresponding to the child units by using the XML information (operation S200-3). In addition, a root unit connected to a unit corresponding to an input contact of the PLC ladder information is set, and a leaf unit connected to a unit corresponding to an output contact of the PLC ladder information is set.

After operation S200-3, according to the relationship between the child units and the parent units, a block is generated in which the units are grouped in the unit table information according to an AND condition or an OR condition, and the control logic information is extracted by repeating the generation of a block until one final block is generated (operation S200-4).

In the operation of extracting the control logic information, when a target unit for generating a block has one child unit and a parent unit of the corresponding child unit is only the target unit, the block is set by grouping the corresponding target unit and the child unit as members that satisfy the AND condition.

In addition, in the operation of extracting the control logic information, when the number of units having the same parent unit as the parent unit of the target unit for generating a block among parent units corresponding to the child units of the target unit is the same as the number of units that have the same ancestor unit as the parent unit of the target unit among parent units corresponding to the child units of the target unit, a block is set by grouping the corresponding target unit and the child unit as members that satisfy the OR condition.

After operation S200, the extracted control logic information is converted into common command information (operation S210). When a block of the control logic information in the form of a block is applied to a decomposition function and the control logic information is an ANB block according to the AND condition, the number of members is extracted. When the number of members of the ANB block is one, common command instruction and address of a contact are returned. On the other hand, when the number of members of the ANB block is two or more, the decomposition function is applied to each member, and the result is added to a string. When the control logic information is an ORB block according to the OR condition, the decomposition function is applied to members of the ORB block, the result is separated by "," and then the separated result is added to a string. Thereafter, a common command converting portion 120 returns a completed string by binding the string with "[" and "]" at the end.

According to the present invention, the control logic information in the form of a block obtained by grouping units that respectively represent contacts and lines constituting the PLC ladder information according to an AND condition and an OR condition is extracted from the XML information, and the control logic information is converted into common command information. Accordingly, any XML documents can be converted into common command information, so that high utilization of PLC ladder information converted into XML information can be achieved.

Text parsing requires each command to map to a common command, and the types of command are very different from one manufacturer to another. Thus, inaccurate mapping may occur. Also, it is very difficult to set criteria for text parsing that will perfectly work for all texts, and thus an exceptional situation (e.g., extracting of wrong common command information) may occur. Extraction of a common command through XML interpretation is easy to respond to any cases since the amount of reference information to be stored is small and a few calculations (relatively fewer criteria compared to text parsing) are continuously used. In fact, ladder information failed in the traditional text parsing is successfully converted through XML.

Text parsing requires parsing all the stored text. Since there are so many criteria for parsing, the parsing does not end with reading the text once, but requires a separate storing process and a repeated search thereafter, thus requiring large amount of computation. On the other hand, XML is much faster, because its structure itself is hierarchical and it only needs to be read once for parent-child relation mapping between units.

An existing verification method for a control program has been carried out through an operator's manual operation and simulation. However, this method costs a lot of time and effort. By converting machine control language (low level language), which is difficult for human beings to analyze, into a common command form, the same analysis is enabled without the need of different analysis services from each PLC manufacturer. Accordingly, the efficiency and effectiveness of process analysis can be increased by interpreting and analyzing a control program converted into the common command form.

Although the exemplary embodiments of the present invention have been described above, one of ordinary skill in the art can understand that a variety of modifications may be made without departing from the essential features of the present invention. Therefore, the disclosed embodiments should be considered in a descriptive aspect not in a limitative aspect. Accordingly, the scope of the present invention is not limited to the above-described embodiments and should be understood as including a variety of embodiments within the range of the content stated in the claims and equivalents thereof.

What is claimed:

1. A method of extracting common command information from programmable logic controller (PLC) ladder information, the method comprising:

extracting control logic information from XML information converted from PLC ladder information; and converting the extracted control logic information into common command information, wherein the extracting of the control logic information includes extracting, from the XML information, the control logic information in the form of a block obtained by grouping units that respectively represent contacts and lines constituting the PLC ladder information according to an AND condition and an OR condition, wherein the extracting of the control logic information includes generating basic unit table information on units including a contact constituting the PLC ladder information, updating the basic unit table information through setting of each of child units corresponding to a lower tree structure of each unit included in the basic unit table information by using the XML information, updating the basic unit table information through setting of parent units corresponding to the child units by using the XML information, and according to a relationship between the child units and the parent units, generating a block in which each unit is grouped according to the AND condition and the OR condition in the unit table information, and extracting the control logic information by repeating the generation of a block until one final block is generated.

2. The method of claim 1, wherein the updating of the basic unit table information through the setting of the child units comprises selecting a target unit and a search coordinate for setting the child units, and computing a calculation coordinate by adding values of +3, +2, and −1022 to the search coordinate.

3. The method of claim 2, wherein the updating of the basic unit table information through the setting of the child units comprises, when the current search coordinate is positioned at a lower location in an image of the XML information compared to the previous search coordinate, computing the calculation coordinate by adding only a value of +3 or +2 to the current search coordinate, and when the current search coordinate is positioned at a upper location in the image of the XML information compared to the previous search coordinate, computing the calculation coordinate by adding only a value of +3 or −1022 to the current search coordinate.

4. The method of claim 3, wherein the updating of the basic unit table information through the setting of the child units comprises, when a unit, other than a horizontal line, an auto-complete horizontal line, and a vertical line, exists on the calculation coordinate obtained by adding +3 to the current search coordinate, setting the unit to be a child unit.

5. The method of claim 4, wherein the updating of the basic unit table information through the setting of the child units comprises, when a horizontal line appears on the calculation coordinate obtained by adding +3 to the current search coordinate, setting a value obtained by adding 3 to the current search coordinate to be a new search coordinate, and when an auto-complete horizontal line appears on the calculation coordinate obtained by adding +3 to the current search coordinate, setting a value obtained by adding 3+length value of the auto-complete horizontal line to the current search coordinate to be a new search coordinate.

6. The method of claim 5, wherein the updating of the basic unit table information through the setting of the child units comprises, when a vertical line appears on the calculation coordinate obtained by adding +2 to the current search coordinate, setting a value obtained by adding +1024 to the current search coordinate to be a new search coordinate, and when the vertical line appears on the calculation coordinate obtained by adding −1022 to the current search coordinate, setting a value obtained by adding −1024 to the current search coordinate to be a new search coordinate.

7. The method of claim 1, wherein the extracting of the control logic information comprises, when a target unit for generating a block has one child unit and a parent unit of the child unit is only the target unit, setting a block by grouping the target unit and the child unit as members that satisfy the AND condition.

8. The method of claim 1, wherein the extracting of the control logic information comprises, when the number of units having the same parent unit as a parent unit of a target unit for generating a block among parent units corresponding to the child units of the target unit is the same as the number of units that have the same ancestor unit as the parent unit of the target unit among parent units corresponding to the child units of the target unit, setting a block by grouping the target unit and the child unit as members that satisfy the OR condition.

* * * * *